(12) United States Patent
Knight

(10) Patent No.: US 7,333,866 B2
(45) Date of Patent: Feb. 19, 2008

(54) COMPUTER IMPLEMENTED MANAGEMENT DOMAIN AND METHOD

(76) Inventor: Gregory John Knight, 2724 91st Crescent N., Brooklyn Park, MN (US) 55443

( * ) Notice: Subject to any disclaimer, the term of this patent is extended or adjusted under 35 U.S.C. 154(b) by 417 days.

(21) Appl. No.: 11/008,600

(22) Filed: Dec. 9, 2004

(65) Prior Publication Data

US 2007/0255438 A1    Nov. 1, 2007

Related U.S. Application Data

(60) Provisional application No. 60/591,642, filed on Jul. 28, 2004.

(51) Int. Cl.
    *G06F 19/00* (2006.01)
(52) U.S. Cl. .................. 700/96; 700/97; 700/100; 700/107; 705/7; 717/101; 707/103 Y
(58) Field of Classification Search ............ 700/95–97, 700/100, 103, 107; 705/7; 717/101; 707/103 Y
    See application file for complete search history.

(56) References Cited

U.S. PATENT DOCUMENTS

| | | | |
|---|---|---|---|
| 5,050,088 A | | 9/1991 | Buckler et al. ............ 364/468 |
| 5,089,970 A | * | 2/1992 | Lee et al. .................. 700/96 |
| 5,463,555 A | * | 10/1995 | Ward et al. ............... 700/96 |
| 5,671,415 A | | 9/1997 | Hossain ..................... 395/701 |
| 6,345,259 B1 | * | 2/2002 | Sandoval ....................... 705/7 |
| 6,988,109 B2 | * | 1/2006 | Stanley et al. .......... 707/103 Y |
| 2002/0042662 A1 | | 4/2002 | Tsukishima et al. .......... 700/95 |
| 2002/0198858 A1 | * | 12/2002 | Stanley et al. ................ 706/50 |

* cited by examiner

*Primary Examiner*—Leo Picard
*Assistant Examiner*—Douglas S Lee
(74) *Attorney, Agent, or Firm*—Nawrocki, Rooney & Sivertson, P.A.

(57) ABSTRACT

A computer implemented management domain for controlling the production of low volume advanced technology articles of manufacture is provided. The management domain includes an information library, an integrated manufacturing intelligence, and an interrogation network which includes a plurality of analyzers. The information library includes a plurality of databases, each of which include objects of an object schema. Objects of the object schema of any one database are linked or linkable to dependent objects of objects of an object schema of another of the databases. The integrated manufacturing intelligence includes a plurality of processors for processing data of the databases. Each analyzer of the plurality of analyzers executable with regard to an advanced technology article of manufacture and/or any object of the objects of said object schema of the databases. Each analyzer implicates at least a single select processor of the plurality of processors, the at least a single select processor of the plurality of processors accessing the information library in furtherance of conducting a select analysis with regard to the advanced technology article of manufacture and/or components thereof.

66 Claims, 44 Drawing Sheets

```
┌BuildIT (R) Data Editor Iss:2.2A ─────────────────────────────
│Project: All Projects      Database: Hardware Config
│ Record: Units             Sequence: Prime key      Action: View
│
│
│        CIDL/Id.: J7M2301/03              Serial no: 001
│           Title: Regulator               EIDP ref.: ERM199814
│  Design std/iss: 103/4                 EIDP std/iss: 100/1
│   Owner's title: Comms power regulation  Product ref: 0027
│
│          Status: Ready for test         QA approved: No
│        Location: B.Ae. Stevenage           Position: +Y
│    Manufacturer: B.Ae.                  Abbreviation: CPSREG
│
│    Run time log: Assume ON with submod  Total run time: 0
│    Actual no ONs: 1                     Allowed no ONs: 0
│     No installs: 1                         Lead time: 1M0D0H00
│    Delivery due: 24.03.2003                 DRB date: 06.04.2003
│   DRB mins. ref: DRB/JNS/42319       DRB no open items: 0
│
│            Mass: +2.603                   X coord: +1.6
│         Y coord: +3.22                    Z coord: +9.86
│
│        Comment: Qualified and life tested OK (Ref report: JNS/QUAL/17442)
│
│ Next Previous Rewind Forwards Sequence Locate Print-this Tabulate-print
│ Chain Add Duplicate Edit Delete Un-delete Purge-database Drop-marker
│ Last-Marker <F1>Online-Help <Esc>Quit
│ Option: []
└──────────────────────────────────────────────────────────────
```

FIG. 11

```
┌Build11 (R) Data Editor Iss:2.20 ─────────────────────────────┐
│ Project: All Projects      Database: Hardware Config         │
│  Record: Units             Sequence: Prime key    Action: View│
│                                                              │
│       CIL/Id.: J7M2301/03              Serial no: 001        │
│         Title: Regulator               EIDP ref.: ERM199814  │
│ Design std/iss: 103/4                  EIDP std/iss: 100/1   │
│                                                              │
│  Circuit functional diagram: JNS/CFD/51134   1               │
│  Design verification matrix: JNS/DVM/51135   2               │
│           Drawing family tree: JNS/DFT/51107   1             │
│        Equipment specification: JNS/EQS/51121   2            │
│      Interface control diagram: JNS/ICD/51126   3            │
│                     Test plan: JNS/TPL/51138   1             │
│                Test procedure: JNS/TPR/51139   3             │
│                   Test report: JNS/TRR/51141   Draft         │
│                  Test results: JNS/TRR/51141   Draft         │
│          Top assembly drawing: JNS/TAD/51131   2             │
│        Misc. main design document:                           │
│                                                              │
│                                                              │
│ 1 Next Previous Rewind Forwards Sequence Locate Print-this Tabulate-print│
│ Chain Add Duplicate Edit Delete Un-delete Purge-database Drop-marker│
│ Last-Marker F1-Online-Help Esc-Quit                          │
│ Option: []                                                   │
└──────────────────────────────────────────────────────────────┘
```

FIG. 12

```
BuildII (R) Data Editor Iss:2.2A
Project: All Projects      Database: Hardware Config
 Record: Spacecraft         Sequence: Prime key     Action: Chain.View CIDL/Id.: JNS0010304               Serial no: 001
           Title: JNS Hitech Hardware      EIDP ref.: 22301
 Design std/iss: 100/1                  EIDP std/iss: 100/1
     Product ref: 0027

Status: Delivered            QA approved: No
        Location: B.Ae. Stevenage         Position: N/A Split screen: Chains                               Viewing screen: 1
Ref.   Item type   |Subcat|Identification          |Description
  1.   Subsystems  |      |J272301M        001     |Comms Subsystem A
  2.   Subsystems  |      |J272302M        001     |Comms Subsystem B
  3.   Subsystems  |      |J272814R        001     |Propulsion
  4.   Subsystems  |      |J274503V        001     |Structure
  5.   Subsystems  |      |J030466S        001     |AOCS
  6.               |      |                        |
  7.               |      |                        |
  8.               |      |                        |
  9.               |      |                        |
 10.               |      |                        |

Prev-screen  Next-screen  Link-chain  De-link-chain  Jump-chain  Drop-marker
Last-Marker  Print-these-chains  Print-All-chains  Tidy  Kill-all-chains
 F1 Online-Help   Esc Quit
Option: []
```

FIG. 13

```
rBuildIT (R) Hi-Tech Hardware Production System Iss:2.2A ─────────────────┐
 Project: All Projects      Database: Hardware Config
  Record: Spacecraft        Sequence: Flagged       Action: View
                                                    Screen: 1
 Last analysis: "Fast comp. - Integrated" Install/remove using system date/t
 Item type    ISubcatIIdentification              IDescription  IStatulQ
 Spacecraft   I     IJNS0010304      001          IJNS HiTech HalDelivIN
 ──────────────────────────────────────────────────────────────────────────
 ▌Spacecraft  I     IJNS0010304      001          IJNS HiTech HalDelivIN
  Subsystems  I     IJ272301M        001          ICommS SubsystIMechaIN
  Subsystems  I     IJ272302M        001          IComms SubsystIDelivIN
  Subsystems  I     IJ272814R        001          IPropulsion   IIntegIN
  Submodules  I     IJ23015542S      001          IComms power  rIReadyIY
  Submodules  I     IJ2232301S       001          IMultibeam antINot dIN
  Submodules  I     IJ2306911S       001          IMultibeam antIKit aIN
  Submodules  I     IJ26069115       001          IProp mod / colIntegIN
  Units       I     IJ7M2301/03      001          IRegulator    IReadyIN
  Units       I     IJ7M4356603      001          IMBA deploymenIKit aIN
  Units       I     IJ7M4356604      001          IMBA reflectorIDelivIN
  Units       I     IJ7M4427703      001          IProp/comms cyIIntegIN
  Unit breakdoICompouI1                           ICompound kit INot aI
  Unit breakdoIDocumeI1                           IDocument collINot aI
  Unit breakdoIDrawinI1                           IDrawings kit IKit aI
  Unit breakdoIFittinI1                           IFittings kit IKit aI
  Unit breakdoIInstruI1                           IMiscellaneousIKit aI S▌rink ▌ntegrated/available Ready-for-▌est ▌ech-fit ▌it-marsh D▌livered
 N▌t-delivered/not-avail. ▌A-toggle ▌et-date/time ▌ext ▌revious Screen-▌ump
 Screen-▌eft Screen-▌ight Screen-▌p Screen-▌own ▌F1▌Online-Help ▌F5▌Quit
 Option: ▌
```

FIG. 14

"Problems & Trends"
Process for Cross-referencing ("Checking") A Single Item

```
┌BuildIT (R) Hi-Tech Hardware Production System Iss:2.2A ─────────────┐
│  Project: Demo Product                                              │
│ Facility: Hardware Configuration Analyses                           │
│                                                                     │
│    1.    Analyse - Display/print results of last analysis           │
│    2.    Analyse - Integrated & QA approved                         │
│    3.    Analyse - Integrated                                       │
│    4.    Analyse - Can we test & QA approved ?                      │
│    5.    Analyse - Can we test ?                                    │
│    6.    Analyse - Can we fit ?                                     │
│    7.    Analyse - Can we kit marshal ?                             │
│    8.    Analyse - Generate kit marshal list                        │
│    9.    Analyse - Centre of gravity                                │
│   10.    Analyse - Delivery lead times                              │
│   11.    Analyse - Non-conforming design/build standards (simplified)│
│ <F1>  Online HELP                                                   │
│ <Esc> Quit                                                          │
│                                                                     │
│                                                                     │
│                                                                     │
│ Option: ▮                                                           │
└─────────────────────────────────────────────────────────────────────┘
```

FIG. 17

```
┌BuildIT (R) Item Identifier  Iss:2.2A ─────────────────────────
│Project: All Projects      Database: Hardware Config
│ Record: Subsystems        Sequence: Prime key      Action: View
│
│       CIDL/Id.: J272302M              Serial no: 001
│          Title: Comms Subsystem B     EIDP ref.: 31221
│Design std/iss: 100/1                EIDP std/iss: 100/1
│    Product ref: 0027
│
│         Status: Delivered            QA approved: No
│       Location: B.Ae. Stevenage         Position: +Y
│   Manufacturer: B.Ae.                Abbreviation: CMS+Y
│
│   Run time log: Applicable          Total run time: 0
│  Actual no ONs: 0                   Allowed no ONs: 0
│   No installs: 0                        Lead time: 106W0D0H00
│  Delivery due: 22.09.2003               DRB date: 12.02.2003
│  DRB mins. ref: DRB/JNS/76122     DRB no open items: 0
│
│          Mass: +1                      X coord: +0
│        Y coord: +1                      Z coord: +0
│
│       Comment:
│
│
│ Next Previous Rewind Forwards Sequence Locate Tabulate-print Drop-marker
│Last-Marker Action-this <F1>Online-Help <Esc>Quit
│Option: □
└──────────────────────────────────────────────────────────────
```

FIG. 19

```
┌BuildIT (R) Hi-Tech Hardware Production System Iss:2.2A ─────────────
│Project: All Projects       Database: Hardware Config
│ Record: Spacecraft          Sequence: Flagged         Action: View
│                                                       Screen: 1
│ Last analysis: "Can we test ? Reply: NO" at: 07.06.2004 18:22 on item:
│ Item type   |Subcat|Identification                    |Description
│ Subsystems  |      |J272302M              001         |Comms Subsystem B
│
│■Subsystems  |      |J272302M              001         |Comms Subsystem B
│ Submodules  |      |J2232301S             001         |Multibeam antenna equ
│ Submodules  |      |J2306911S             001         |Multibeam ant. feed a
│ Units       |      |J7M4356603            001         |MBA deployment arm
│ Units       |      |J7M4356604            001         |MBA reflector assembl
│ Unit breakdo|Compou|1                                 |Compound kit
│ Unit breakdo|Docume|1                                 |Document collation
│ Unit breakdo|Drawin|1                                 |Drawings kit
│ Unit breakdo|Fittin|1                                 |Fittings kit
│ Unit breakdo|Instru|1                                 |Miscellaneous instrum
│ Unit breakdo|Passiv|1                                 |Blankets
│ Documents   |      |JNS/TPR/51139                     |Regulator ATP
│ Fittings kit|Adapto|2                                 |N-BNC adaptors
│ Stocks      |      |3082-0203-23          0           |N-BNC adaptors
│ Instrumentat|      |J234155               001         |Thermometer
│ Passive ther|      |J12121212             12          |C-band feed blanket
│ Passive ther|      |J12121213             06          |S-band feed blanket
│
│▇ulti-select Prin▇-table ▇ext ▇revious Screen-▇ump Screen-▇eft Screen-▇ight
│Screen-▇p Screen-▇own ▇F1▇Online-Help ▇Esc▇Quit
│Option: ▯
└─────────────────────────────────────────────────────────────────────
```

FIG. 20

```
┌BuildIT (R) Hi-Tech Hardware Production System Iss:2.2A ─────────────────┐
│Project: Demo Product        Database: Problem & Quali                    │
│ Record: Problem reports (P Sequence: Flagged       Action: View          │
│                                                    Screen: 1             │
│ Last analysis: "Can we test ? Reply: NO" at: 07.06.2004 18:22 on item:   │
│ Item type   |Subcat|Identification            |Description               │
│ Subsystems  |      |J272302M         001      |Comms Subsystem B         │
│                                                                          │
│▌Problem id.: JNS0046            Classification: Not set  Status: Raised │
│ Ref. title: Multibeam antenna equip.   Problem: Locating hole for pivot pi│
│ Ref. CIDL/Area: J2232301S        Ref. serial no: 001                    │
│                                                                          │
│ Problem id.: JNS0055            Classification: Not set  Status: Raised │
│ Ref. title: MBA deployment arm         Problem: Thermal test 12, part 2 sh│
│ Ref. CIDL/Area: J7M4356603       Ref. serial no: 001                    │
│                                                                          │
│ Problem id.: JNS0054            Classification: Major    Status: Opened │
│ Ref. title: Multibeam antenna equip.   Problem: Antenna signal feed cracke│
│ Ref. CIDL/Area: J2232301S        Ref. serial no: 001                    │
│                                                                          │
│ Open item id.: JNS0024           Status: Actioned  Ref. item type: Subm │
│ Ref. title: Multibeam antenna equip.   Description: Inserts have been plac│
│ Ref. CIDL/Area: J2232301S        Ref. serial no: 001                    │
│──────────────────────────────────────────────────────────────────────────│
│                                                                          │
│▌ulti-select Prin▌-table ▌ext ▌revious Screen-▌ump Screen-▌eft Screen-▌ight│
│Screen-▌p Screen-▌own ◄F1►Online-Help ◄Esc►Quit                          │
│Option: □                                                                 │
└──────────────────────────────────────────────────────────────────────────┘
```

FIG. 21

| Analysis Type | Selected Product Item Qty | Selected Product Item Inventory Qty | Sub Sub Product Item Qty | Product Sub Item Name Qty | Product Sub Item Inventory Qty | Product Size Name Qty | Problems | Sheet Degree | Mill cost | MBS | Wafer X & Rep | Roll scribe Item Loss | Other |
|---|---|---|---|---|---|---|---|---|---|---|---|---|---|
| Integrated & QA improved | Yes | Yes | No | Yes | Yes | Yes | Yes | Yes | Yes | Yes | Yes | Yes | Yes |
| Integrated | Yes | Yes | No | Yes | Yes | No | Yes | Yes | Yes | Yes | Yes | Yes | Yes |
| Can we test & fix sooner? | Yes | Yes | No | Yes | Yes | Yes | Yes | Yes | Yes | Yes | Yes | Yes | Yes |
| Can we test? | Yes | Yes | No | Yes | Yes | No | Yes | Yes | Yes | Yes | Yes | Yes | Yes |
| Can we mechanically test? | Yes | Yes | No | Yes | Yes | No | Yes | Yes | Yes | Yes | Yes | Yes | Yes |
| Can we kit material? | Yes | Yes | No | Yes | Yes | Yes | Yes | Yes | Yes | Yes | Yes | Yes | Yes |
| Timeline for material bar | Yes | Yes | No | Yes | Yes | No | No | No | No | No | No | No | No |
| Centre of gravity | Yes | No | No | Yes | No | No | No | No | No | No | No | No | No |
| Delivery lead time | Yes | No | No | Yes | No | No | No | No | No | No | No | No | No |
| Non-conforming to product standards | Yes | No | No | Yes | No | No | No | No | No | No | No | No | No |

FIG. 22

```
┌BuildIT (R) Project Plan Calendar & Timetable Editor Iss:2.20 ─────────────
│ Project: Demo Product
│ Facility: Calendar & Timetable Facilities
│ ┌─────────────────────────────────────────────────────────────────────────┐
│ │              Calendar Years = 2004 to 2005                              │
│ │                 ┌─Date      Hrs Min   Date      Hrs Min   Date      Hrs Min
│ │                 │    9  =   40H00   Jun  7  =  40H00   Oct  4  =  40H00
│ │    Breakdown    │   16  =   40H00        14  =  40H00        11  =  40H00
│ │  Day    Hrs Min │   23  =   40H00        21  =  40H00        18  =  40H00
│ │  Mon =    8H00  │Mar  1  =  40H00        28  =  40H00        25  =  40H00
│ │  Tue =    8H00  │    8  =   40H00   Jul  5  =  40H00   Nov  1  =  40H00
│ │  Wed =    8H00  │   15  =   40H00        12  =  40H00         8  =  40H00
│ │  Thu =    8H00  │   22  =   40H00        19  =  40H00        15  =  40H00
│ │  Fri =    8H00  │   29  =   40H00        26  =  40H00        22  =  40H00
│ │  Sat =    0H00  │Apr  5  =  40H00   Aug  2  =  40H00        29  =  40H00
│ │  Sun =    0H00  │   12  =   40H00         9  =  40H00   Dec  6  =  40H00
│ │  Tot =   40H00  │   19  =   40H00        16  =  40H00        13  =  40H00
│ │                 │   26  =   40H00        23  =  40H00        20  =  40H00
│ │ Date    Hrs Min │May  3  =  40H00        30  =  40H00        27  =  40H00
│ │ Jan  5 =  40H00 │   10  =   40H00   Sep  6  =  40H00   Jan  3  =  40H00
│ │     12 =  40H00 │   17  =   40H00        13  =  40H00        10  =  40H00
│ │     19 =  40H00 │   24  =   40H00        20  =  40H00        17  =  40H00
│ │     26 =  40H00 │   31  =   40H00        27  =  40H00        24  =  40H00
│ │ Feb  2 =  40H00 │
│ └─────────────────────────────────────────────────────────────────────────┘
│ Next-week Previous-week NeXt-year PreVious-year Jump-year Format Print-this
│ <F1>Online-Help <Esc>Quit
│ Option: ▌
```

FIG. 30

```
┌BuildIT (R) Data Editor Iss:2.2A ─────────────────────────────
│ Project: Demo Product      Database: Project Plannin
│  Record: Activities        Sequence: Prime key       Action: View
│
│
│ Owning network no: 1              Activity no: 23
│    Activity desc.: Inspect M.G.S.E. etc.
│ Expected duration: 2W0D0H00       Actual duration: 0W0D0H00
│        Date started: 0               %Complete: 0
│      Date completed: 0
│     Constrain start: 0             Constrain finish: 0
│
│            Fitter: +0.00              Technician: +0.00
│    Mechanical Eng: +1.00            Electrical Eng: +0.00
│    Test Conductor: +0.00               QA Engineer: +1.00
│
│   Add. fixed price: 0            Work package no: EN2900/2010
│
│           Comment:
│
│
│
│
│
│ Next Previous Rewind Forwards Sequence Locate Print-this Tabulate-print
│ Chain Add Duplicate Edit Delete Un-delete Purge-database Drop-marker
│ Last-Marker Blinkers-on/off   Online-Help     Quit
│ Option: []
```

FIG. 32

```
BuildIT (R) Hi-Tech Hardware Production System Iss:2.2A
 Project: Demo Product                    Central control auto X-ref: Inactive
Facility: Central Control System 1.  Setup equipment automatic cross-reference
   2.  Cancel equipment automatic cross-reference
   3.  Turn equipment on or off
   4.  Install or remove equipment (fast completion)
   5.  Raise problem or quality report
   6.  Record equipment earthing measurement
   7.  Record comment in the events and comments log
   8.  Record comment in the automatic reminder log
   9.  Perform configuration check (CC)
  10.  Record work (Task list fast completion)
 <F1> Online HELP
 <Esc> Quit Option:
```

FIG. 40

```
BuildIT (R) Hi-tech Hardware Producti  BuildIT (R) Online Help Iss:2.20
Project: Demo Product
Facility: Central Control System         Central Control System 1.  Setup equipment automatic cross    Introduction
  2.  Cancel equipment automatic cros    In    order    to   further   enhance   the
  3.  Turn equipment on or off           convenience    of   the   BuildIT   system,
  4.  Install or remove equipment (Fa    access    to   frequently   used   basic
  5.  Raise problem or quality report    functions    and   facilities,   normally
  6.  Record equipment earthing measu    available   throughout   the   system,   has
  7.  Record comment in the events on    been   routed via a single menu facility
  8.  Record comment in the automatic    called   the   "Central control"   system.
  9.  Perform configuration check (CC    All   the   basic   functions   used   several
 10.  Record work (Task list fast com    times  a  day  (such  as  shown  below)  are
 <F1> Online HELP                        either   directly   available   from   this
 <Esc> Quit                              menu, or are only one menu away.

The   central   control   system   hosts   the
                                         following facilities:

- Flag equipment as turned on or off

- Install or remove equipment,
                                           including alter hardware
                                           configuration status, alter hardware
                                           QA status, allocate (issue) stock
 Option:
                                         Next Previous Index  Esc Quit
                                         Option: []
```

FIG. 41

COMPUTER IMPLEMENTED MANAGEMENT DOMAIN AND METHOD

This is a regular application filed under 35 U.S.C. §111(a) claiming priority under 35 U.S.C. §119(e)(1), of U.S. provisional patent application Ser. No. 60/591,642, having a filing date of Jul. 28, 2004.

TECHNICAL FIELD

The present invention generally relates to, among other things, the gathering, storing, cross referencing, and intelligent analysis of information associated with the production (i.e., assembly, build, integration, test, etc.) of high technology items, more particularly, to a computer implemented management domain, and attendant methodology, for advanced technology system integration.

BACKGROUND OF THE INVENTION

The production (i.e., assemble, integration, build, test, and quality assurance (QA)) of high technology products (e.g., satellite, ship, air-spacecraft, defense weapon, etc.) is a complex process, requiring timely, accurate, and comprehensive information from a very broad range of sources. The "management" of all necessary information is usually split between several discrete computer programs which cannot talk to each other, plus a variety of well known manual data logging & manual analysis methods.

Although there exists numerous ongoing problems associated with the production of high technology products, the industry remains fundamentally hamstrung by missed delivery dates, project delays, and commensurate costs overages. Anecdotally, we all hear about the satellite/ship/air-spacecraft/defense weapon program (Olympus satellite) that was expected to take "5" years, but during those "5" years, it slipped "5" years. After 5 years from commencement of program initiation, the party responsible for delivery of the satellite/ship/air-spacecraft/defense weapon were no closer to finishing than when they started!

There are yet additional problems, namely problems with configuration management and build standards whereby hardware is built with the wrong or defective components, and thusly does not function as intended. A classic example of the subject problem is the Hubble Space Telescope. After Hubble's deployment in 1990, scientist realized that the telescope's primary mirror had a flaw called spherical aberration. The outer edge of the mirror was ground too flat by a depth of 2.2 microns (i.e., roughly equal to one-fiftieth the thickness of a human hair). This aberration resulted in images that were fuzzy because some of the light from the objects being studied was being scattered. The Corrective Optics Space Telescope Axial Replacement (COSTAR), a telephone booth-sized instrument which placed five pairs of corrective mirrors in front of the Faint Object Camera, the Faint Object Spectrograph and the Goddard High Resolution Spectrograph, was developed and deployed as an effective means of countering the effects of the flawed shape of the mirror. Sadly, the correct primary mirror was sitting in the assembly hall, but owing to a configuration omission, was not fitted to the satellite.

Problems with quality management and modifications, whereby hardware is built incorrectly or with defects, are not detected or detectable. As such, improved auditing remains an issue, such scenarios typically owing to a poor/inadequate audit trail.

There are still further problems, namely problems with overall/select information availability (i.e., information access), whereby information known to some parties is not disseminated in a way that the parties who need to know it obtain it. This can result in tests being performed with the wrong product set up, or the wrong unit condition. Such scenario, at a minimum resulting in resource mismanagement, has been known to result in product/component malfunction, damage to property, and personnel injury.

The subject "problems," which are far from exhaustive, are arguably the result of just too many inputs to be properly and adequately processed by known computer implemented, or manual, systems and/or methods.

Fundamental to the subject problem/solution calculus, and thus the subject invention, is an appreciation of the high volume production versus low volume production distinction, the former being the subject of a variety of solutions, for example, those exemplified by, among others, U.S. Pat. Nos. 5,089,970 (Lee et al.), 5,463,555 (Ward et al.), and 6,345,259 (Sandoval).

The main activities exemplified by a typical manufacturing operation are illustrated in FIG. 1, a simple process schematic of manufacturing business activities. In a high-volume manufacturing scenario, such as the manufacture of wiper motors for motor cars, the "make product" task 50, FIG. 1, off-center left, may be a five minute robotic task. The main cost saving available (i.e., margin) is in keeping manufacturing at maximum throughput, and balancing inventory with orders, so either Manufacturing Resource Planning (MRP), Enterprise Resource Planning (ERP), Supply Chain Management (SCM), and/or Customer Relations Management (CRM) are appropriate approaches (i.e., solutions), which benefit the business in a variety of tangible ways. Heretofore know configuration management systems/methodologies essentially establish the widget specification, specify the widget tooling, then mass produce the widgets by the hundreds, thousands, etc. Subsequently, a small modification is made, the tooling reconfigured, and mass production of the widget by the hundreds, thousands, etc. continues.

In a low-volume, high technology, manufacturing scenario, such as the manufacture of satellites, ships, air/spacecrafts, defense weapons, etc., "Make product" can be a six plus month manual task, requiring tens of thousands of labor hours, hours which are logged by highly skilled engineers and technicians. There is no automatic tooling involved. The "make product" box now represents 90%+of the manufacturing cost. The main cost saving (i.e., margin) is in helping engineers "make product" manually, not in MRP, design, tooling, etc.

Heretofore known systematic "make product" tools are all based around project planning/management technology. There is an essential project planning system at the core of the known manufacturing systems, including, but not limited to MRP, ERP, SCM, and CRM. As alluded to earlier, this approach is fine for high volume manufacturing, which is mainly concerned with an automated manufacturing process, wherein time and materials planning is especially critical. However, low-volume, high technology manufacturing is largely manual, and due to characteristic extreme complexity, so many other factors are implicated, invalidating the common approaches like ERP, etc., and removing the focus from the project plan, to an integrated manufacturing/build environment.

Furthermore, a drawback of the referenced approaches, i.e., those with project planning at their core, is that project planning is a monitoring technology, not a controlling technology. Hence, such systems tell you that "the toast just burned," whereas a controlling technology of the subject invention puts the users in control to "prevent the toast from burning". One key to having a controlling technology is that all the inputs to the build/assembly/test/QA process are linked, as are the "manual" manufacturing processes, so that the information can be fully integrated, in furtherance of being intelligently analyzed, providing a user with true knowledge about the current situation, not just a theoretical plan about what the situation should be like. A paradigm shift from "project management" to "manufacturing intelligence" is essential.

Thus, in light of the foregoing, there remains a need to provide a comprehensive management domain for all information for high technology product manufacture to be gathered, stored, intelligently analyzed, coordinated and cross-referenced, especially now as the technological sophistication of high technology products, and components thereof, have a further complicating potential in the manufacturing context. Furthermore, it remains advantageous to provide a system and method for high technology product manufacture wherein costs are reduced, both engineering quality and QA information improved, and product deliver time shortened. Further still, it is especially advantageous to: provide a deep-level, advanced configuration management system, integrated with all other areas of the manufacturing intelligence (e.g., engineering, test, QA, build, modifications, inventory, problems, resources, and non project management-based scheduling, etc.); incorporate a project management package into the manufacturing intelligence and advanced configuration management system such that there is a two-way flow of information between the project management system and the rest of the management domain, thereby reducing the size of a corresponding plan, while improving its accuracy; and, utilize the two-way flow of information to determine, not just the dates for work to be done, but the optimal path through the project plan (i.e., the state of information in the management domain will change the project plan to fit).

More specific features and advantages obtained in view of those features will become apparent with reference to the drawing figures and DETAILED DESCRIPTION OF THE INVENTION.

SUMMARY OF THE INVENTION

A computer implemented management domain for controlling the production of low volume advanced technology articles of manufacture is provided. The management domain generally includes an information library, an integrated manufacturing intelligence, and an interrogation network which includes a plurality of analyzers. The information library includes a plurality of databases, each of which include objects of an object schema. Objects of the object schema of any one database are linked or linkable to dependent objects of objects of an object schema of another of the databases. The integrated manufacturing intelligence includes a plurality of processors for processing data of the databases. Each analyzer of the plurality of analyzers executable with regard to an advanced technology article of manufacture and/or any object of the objects of said object schema of the databases. Each analyzer implicates at least a single select processor of the plurality of processors, the at least a single select processor of the plurality of processors accessing the information library in furtherance of conducting a select analysis with regard to the advanced technology article of manufacture and/or components thereof. In an alternate embodiment, the management domain includes an integrated manufacturing intelligence comprising a variety of processing engines, databases accessible by the engines, and a library of analysis functions which implicate select engines and databases.

Key, non-limiting analysis include those relating to configuration and components, quality, problems and trends, modifications and costs, "what-if" scenarios, and project management, more particularly, resource planning and logistics. For each analysis function there exists at least one related processing engine, and at least a single database for consideration in furtherance of assessment. Key, non-limiting databases include product details, and overall project plan, the following further databases being generally related to one or the other as will be later discussed, namely, structure breakdown, integration state, quality compliance state, installation/removals, build standard reconciliations, cross-reference library, manpower requirements, costs, and availability, project costs, real time constraints, etc.

BRIEF DESCRIPTION OF THE DRAWINGS

Referring now to the drawings wherein like numerals are used to designate like parts of the invention throughout the figures:

FIGS. 11-13 depict screen shots associated with the product details and structure breakdown interfaces of FIGS. 6-8;

FIG. 14 depicts a screen shot of the fast completion system function relating to the product details database of FIG. 5;

FIGS. 17-21 depict screen shots associated with a manufacturing readiness analysis, more particularly that associated with the product tree analyzer of processing engines of FIG. 3;

FIG. 22 depicts an illustrative set of criteria in furtherance of the manufacturing readiness analysis of FIGS. 17-21;

FIG. 26 depicts the portion of the product component structure of FIG. 24 for which the traversal of FIGS. 25A-25C is applied;

FIGS. 30 and 31 depict screen shots of the calender display and time table display, respectively, associated with the project management functionality;

FIGS. 32-34 depict screen shots of the activity editor, bar chart, and network diagram features of the planning system of the project management functionality;

FIGS. 40 and 41 depicts screen shots associated with the central control function of FIG. 39; and, FIG. 42 depicts both processing engines and databases implicated in a what if analysis.

DETAILED DESCRIPTION OF THE INVENTION

Figure 1:
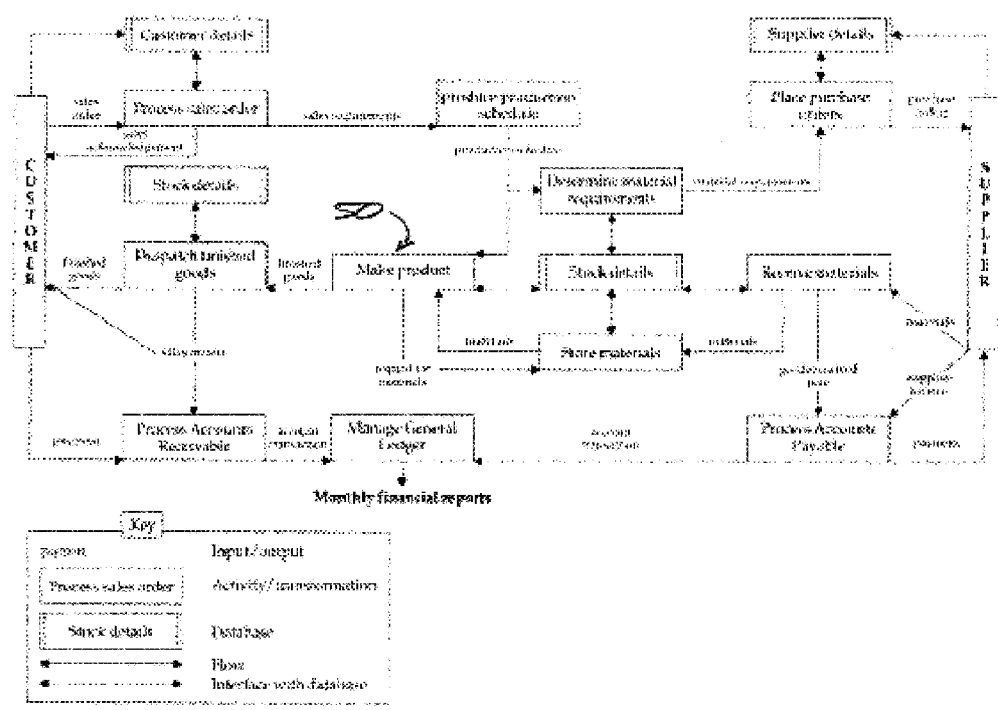
FIG. 1 schematically depicts a simplified process flow for activities associated with a typical manufacturing business.
Figure 2:
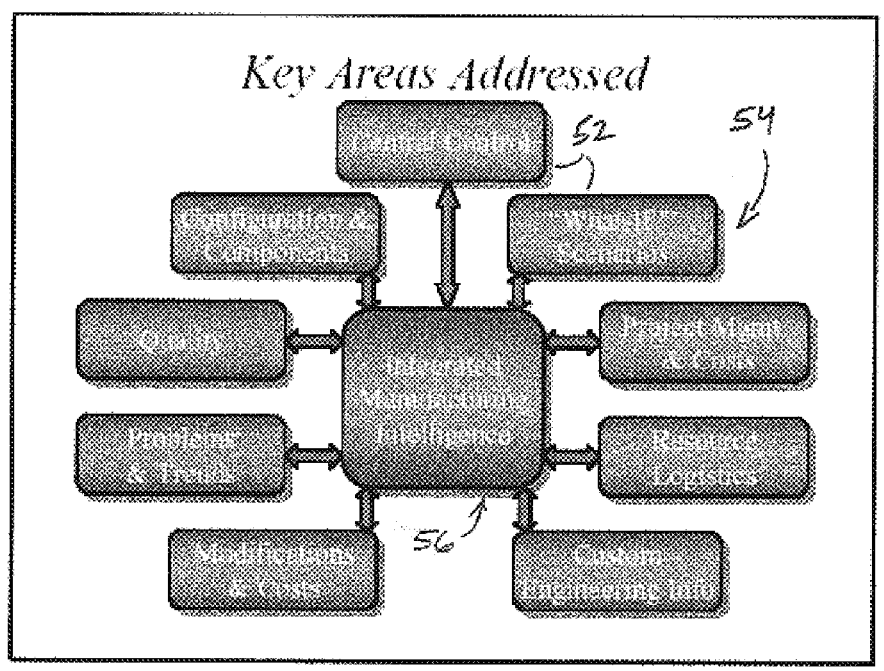
FIG. 2 depicts an integrated manufacturing intelligence in relationship to select advantageous functions or function areas, more broadly, a library of analysis functions.
Figure 3:
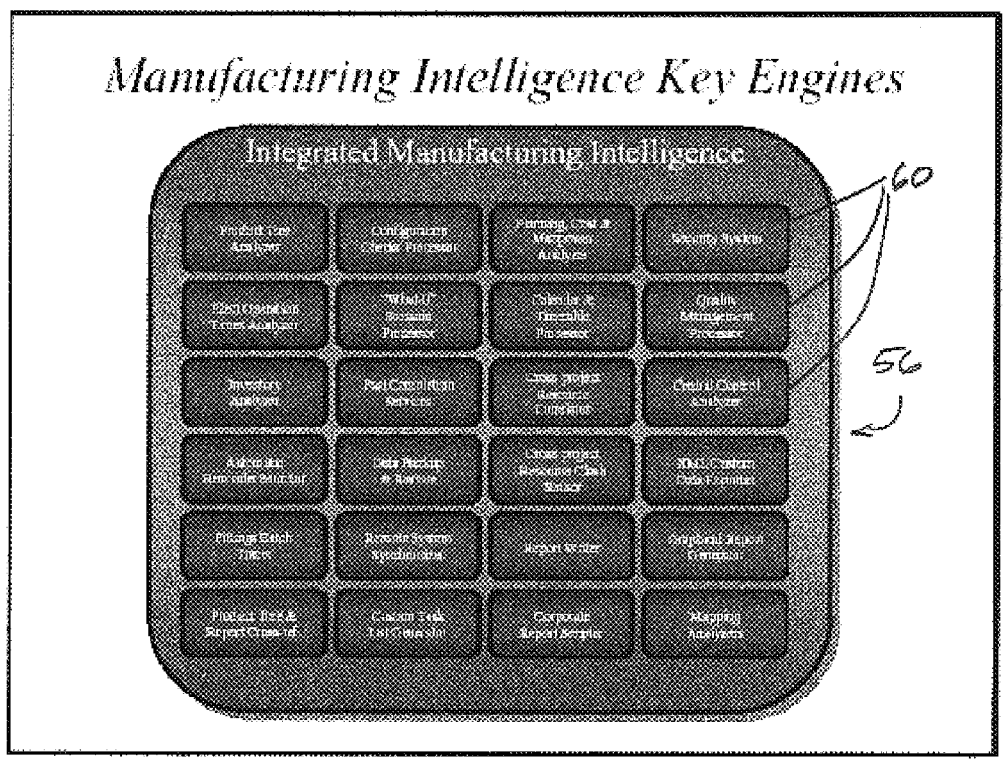
FIG. 3 depicts functional processing engines of the integrated manufacturing intelligence of FIG. 2.
Figure 4:
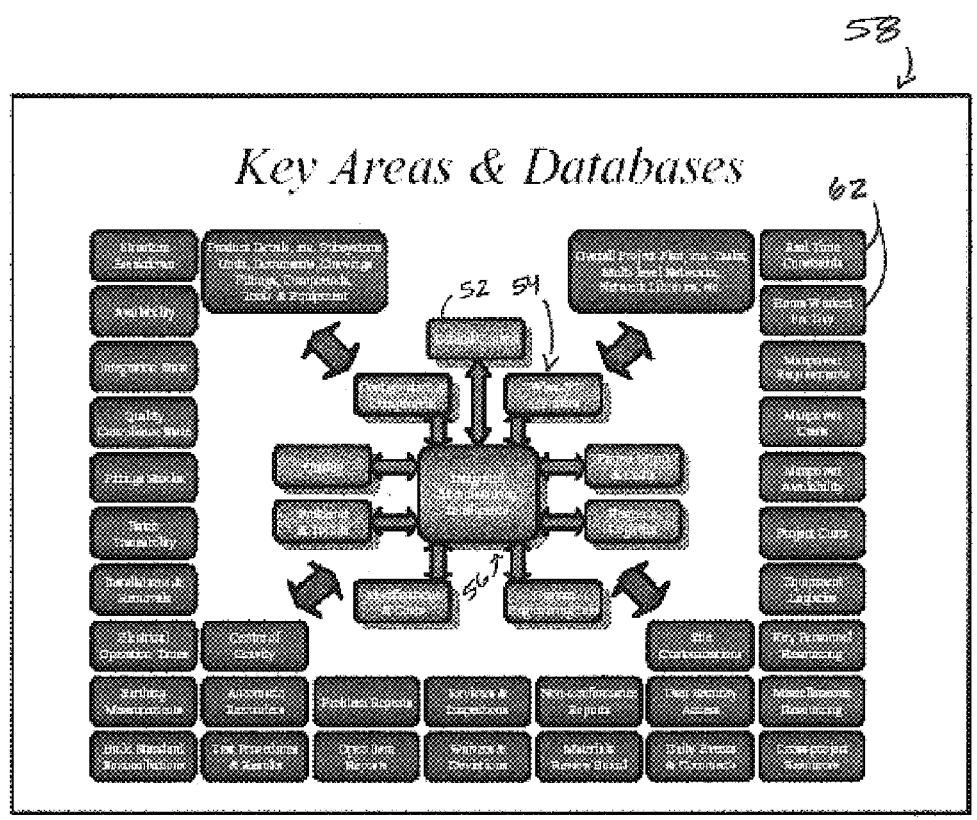
FIG. 4 depicts the management domain of the subject invention, more particularly, the interrelationships between the processing engines of FIG. 3, the databases accessible thereby, and analysis functions of FIG. 2.

As a preliminary matter, and with reference to FIGS. 2-4, advantageous, non-limiting functions or functional areas 52, selectable from a library 54 of analysis functions 52, are indicated in relation to an integrated manufacturing intelligence 56 so as to facilitate building, more generally producing, the "product" (i.e., the "make product" step of FIG. 1), both the library 54 and integrated manufacturing intelligence 56 being constituents of the subject configuration management system 58. The integrated manufacturing intelligence 56 generally includes a plurality of functional processing engines 60 for select processing of information, FIG. 3 depicting select advantageous, non-limiting functional processing engines. The subject configuration management system 58 further includes databases 62 (FIG. 4), preferably but not necessarily in the form of an information or data library, so as to be accessible by the plurality of functional processing engines 60, in furtherance of select processing of at least a portion of the information to be processed thereby. The elements depicted in FIG. 4, and interrelationships therebetween, represent the management domain of the underlaying configuration management system and method.

Fundamentally, the subject computer implemented management domain facilitates advanced technology system integration of subsystems, each of which includes at least a single unit, in furtherance of building a product comprising the integrated subsystems. More generally, the subject computer implemented management domain facilitates the production of low volume, advanced technology articles of manufacture. Preferably, the computer implemented management domain includes the integrated manufacturing intelligence 56, databases 62, and analysis functions 52 selectable, either manually, as by a user menu selection, or automatically, from a library of analysis functions 54. The selection of analysis functions 52 from the library of analysis functions 54 implicate select functional processing engines of a plurality of functional processing engines 60 of the integrated manufacturing intelligence 56, as well as related databases 62 of the databases accessible by the plurality of functional processing engines 60. Through such relationships, as will be subsequently discussed, a readiness status for one or more product dependent items (e.g., system, subsystem, unit, etc.) of the product is determined or otherwise ascertained in furtherance of establishing and/or reestablishing a preferred integration path for the advanced technology system integration.

As best seen with reference to FIG. 2, the library of analysis functions 54 generally include the following, non-limiting analysis functions, starting top central and moving clock-wise: central control; "what-if?" scenarios; project management and cost; resource logistics; custom engineering information; modifications and cost; problems and trends; quality; and, configuration and components. With regard to the key engines of the manufacturing intelligence 56, as well as the character of the databases, each of FIGS. 3 and 4 generally outline same, with further discussion of the analyses, and illustrations, to follow in the balance of the subject disclosure.

Figure 5:
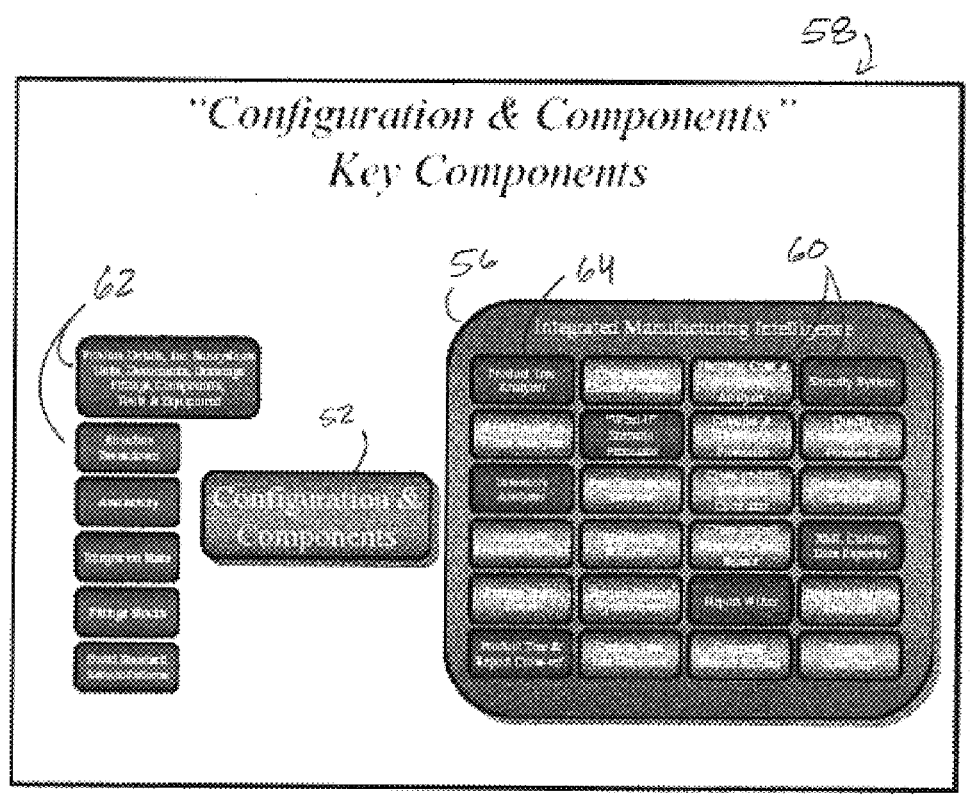
FIG. 5 depicts both processing engines and databases implicated with the selection of a configuration and component analysis.

Referring now generally to FIGS. 5-8, aspects of the interrelationships among the several elements of the subject management domain (e.g., FIG. 5), and the underlaying information management "tree" (e.g., FIGS. 6-8) are noted, more particularly, in the context of a "configuration & components" query vis-a-vis selection of that analysis function. Prior to further general discussion of the underlaying information framework, it is to be understood that select analysis functions essentially link or unite one or more databases to/with one or more processing engines. It is especially advantageous to consider (i.e., make available as inputs for analysis) information or data regarding a variety of aspects, features, character, quality, status, etc. of the "product" (e.g., the advanced technology system), including, but not limited to, subsystems thereof, and the further constituents of the subsystems, e.g., "units." For example, and as indicated in FIG. 5, the following databases may be implicated in the select analysis: product details; structure breakdown; availability; integration state; fitting stocks; and, build standard reconciliation.

The "product details" database of FIG. 5 includes information for every component of the product. Details include information like the title, part and serial number(s), configuration reference numbers, etc. The contemplated detailed schema for the subject database is subsequently outlined, more particularly, with regard to an advanced configuration management object schema for the subject system and method.

Figure 6:
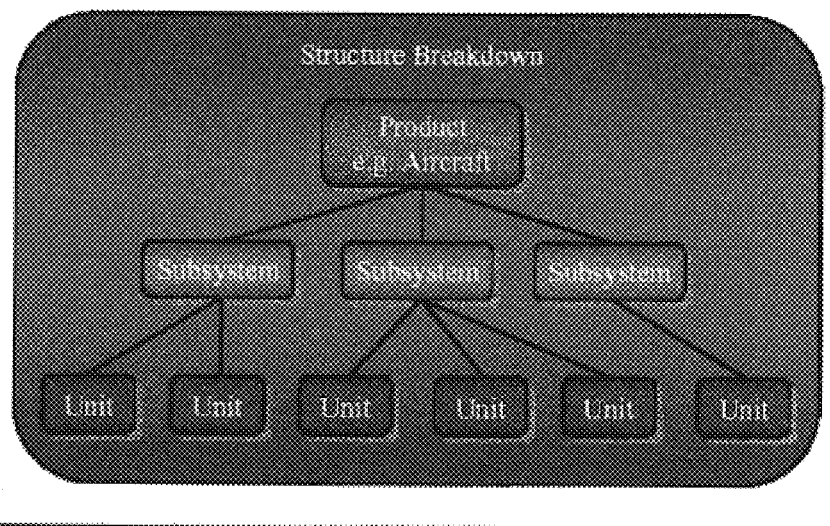
FIG. 6 depicts the relationships between structures of the product details database of FIG. 5.
Figure 7:
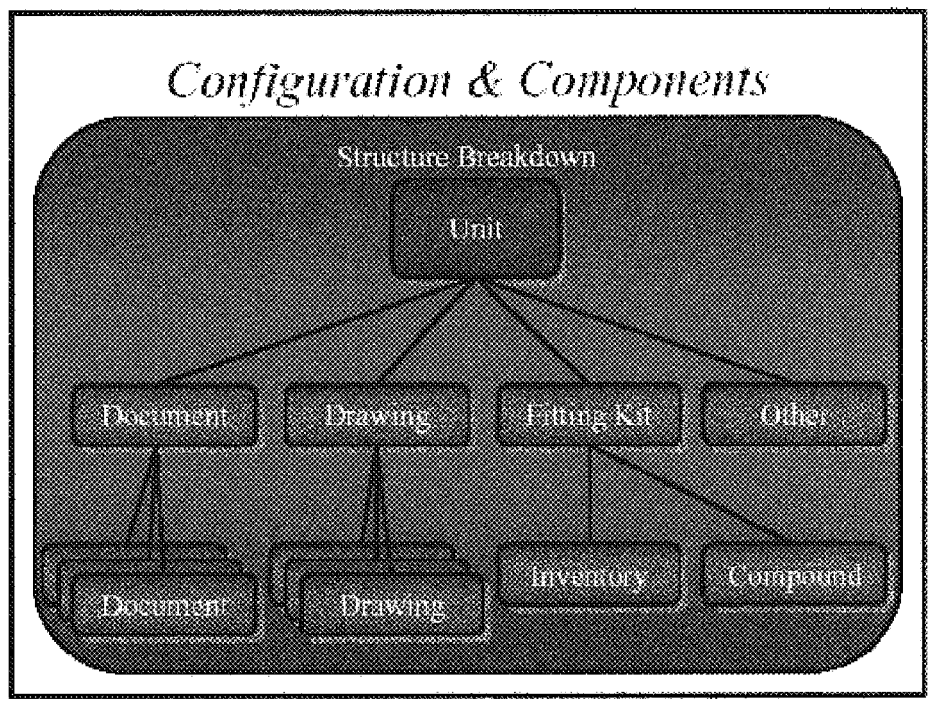
FIG. 7 depicts a further/continued structure breakdown of the unit of FIG. 6.
Figure 8:
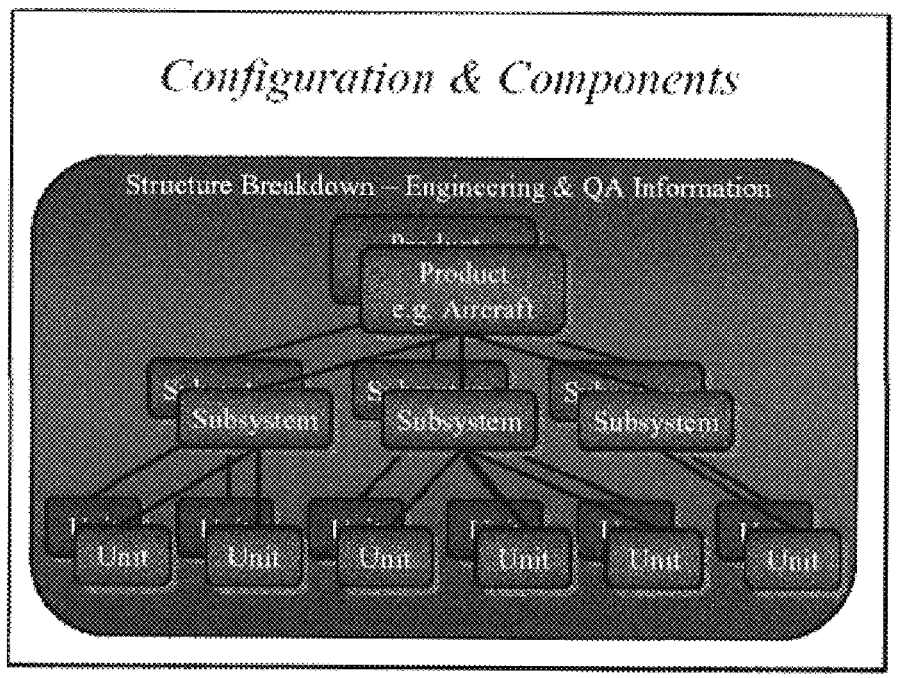
FIG. 8 depicts an illustrative structure breakdown for engineering and QA information.

The whole structure (i.e., the structure in its entirety) of the product being built (e.g., an aircraft) is broken down into a hierarchal arrangement of elements, the product being at the top of the hierarchy, and the components that make up the product occupying levels there below (FIGS. 6-8). As should be readily appreciated, different types of components occupy different levels of the hierarchy, e.g., and as indicated: Product (e.g. aircraft/satellite/etc.); Subsystems; Units; Compounds; Documents; Drawings; Fittings; Kits; Stocks; Instrumentation; and, Miscellaneous. However, this is not just a hierarchical set of levels (i.e., a one dimensional or linear array), instead, the subject invention requires and permits every specific item to be "linked" to the items used, or to be used, to build the product. For example, an aircraft may link to a number of specific subsystems. Each subsystem may link to the specific units built into that subsystem, etc. This can be seen by the linkages in the subject figures, a link being a reference from one specific object in the database, to another specific object in the database. Finally, it is to be understood and appreciated that the product breakdown database may include non-hierarchical relationships between objects of the product breakdown database.

Typical, heretofore known relational database fields are not sufficient for describing the "links" above. This is because a field, for example, in a unit (i.e., "owning subsystem") to describe what subsystem it belongs in is only workable if the above hierarchy levels are strictly adhered to. The usual relational mechanism would break down if a unit was linked to (i.e., was the parent of) another unit, the "owning subsystem" would be generally correct, but it would not be possible to understand the unit-to-unit relationship. However, the subject link mechanism allows this to occur, providing essential flexibility for the user. There are many cases where a user, owing to the complexity of the product, would need more than a single layer (i.e., subsystem) between "product" and "unit". By this mechanism, subsystems can be parents of other subsystems, etc.

The subject level of detail thus allows very accurate analyses to be performed by traversing the structure breakdown tree from any node (i.e., specific product/subsystem/unit etc.) downwards. Thus, results obtained are specific only to the item (i.e., product/subsystem/unit) of interest. We are not dealing with "Is there a unit X available?", but "Is the specific unit X for subsystem Y on aircraft Z available?" This is not a matter of "Is there a generic one in stock", but of "Is the specific one planned for, down to the serial number, in stock?" This distinction is vital for high technology hardware production.

To enable this mechanism in a way which is visible to a user (i.e., human readable), every item in the database is uniquely identified by part number and serial number. The part number identifies the "type" of unit involved, for example, a particular type (e.g., model, manufacturer, etc.) of battery. The serial number allows one unit (e.g., battery) of that type to be uniquely identified. For example, this is the particular battery that was fitted to a particular satellite. We can tell that this battery was fitted to this satellite, because the objects are linked in the database.

As previously alluded to, each item in the hierarchy has several states associated with it, the primary ones being: Availability; Status; and, QA Approved. Generally, each item will have a single value for each of these states (i.e., a status from a status field), however, "Status" and "Availability" have been merged to a single menu choice, since an item has to be available before it can be integrated. Status is primarily an engineering related status. It can be one of the following: "available", relating to documents and the like, or "integrated" for main components, e.g., product/aircraft, subsystems or units (i.e., the main component has been mechanically fitted, and has passed electrical integration tests); "ready for test" (i.e., the item has been mechanically fitted, and electrically connected, either to the product or to test equipment, it has not yet passed electrical integration tests); "mechanically fitted" (i.e., the item is not electrically connected, but physically attached); "kit marshaled" (i.e., the kit, e.g., nuts, bolts, documents, drawings, etc. have been collected from stores); "delivered" (i.e., the item is in stores, and available for fitting); "not available/not delivered" (i.e., the item is not available). The "QA Approved" is exclusively a QA controlled status, and can be "yes" or "no".

With reference now to FIG. 8, the combination of information is like having two, or more as the case may be, "layered" trees of information. As shown, the engineering (& availability) status information is represented as being in one "tree" (shown in blue, i.e., the foreground), and the QA information as being in another, separate tree (shown in red, i.e., the background), arranged just behind, partially hidden by, the first tree.

It should be readily appreciated that the relationships, and interrelationships described and shown allow for complex analyses to be carried out, allowing for: engineering status only, i.e., just the blue tree; QA status only, i.e., just the red tree; both QA & engineering status, by "linking" the two trees in one of several ways as will be subsequently discussed.

Figure 9:
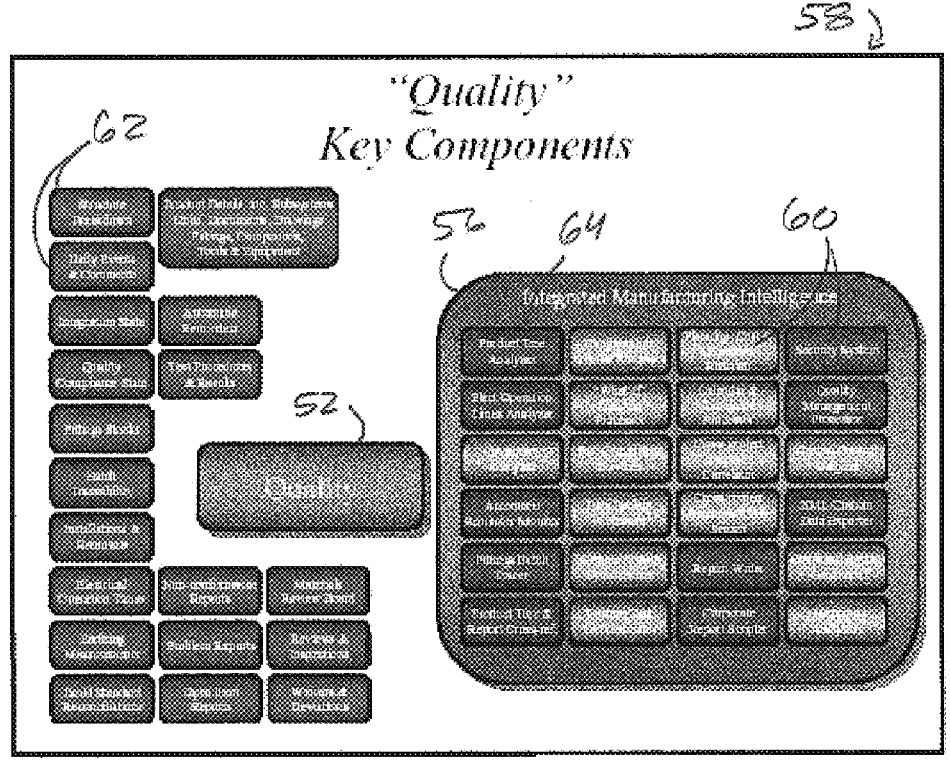
FIG. 9 depicts both processing engines and databases implicated in furtherance of a quality analysis.
Figure 10:
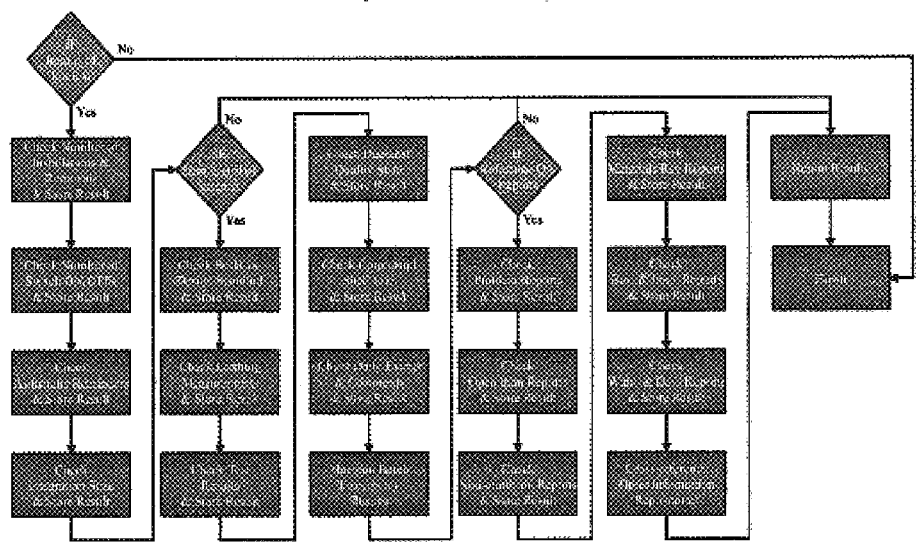
FIG. 10 illustrates a process flow for the quality analysis of FIG. 9.

Furthermore, for many operations during aircraft manufacture, the engineering group does not need to be concerned with the QA status. This is especially true during early phases of assembly. However, as the product nears completion, all work must have QA approval, so the QA state becomes of great concern to the engineering group. Similarly, the QA group is more concerned with what they have/have not approved, rather than what the engineers may think is integrated. Finally, there are many situations where the engineering & QA groups would want to work very closely together, so the ability to run analyses that intelligently interrogate both "trees" is also important. This layered or stacked data/information system allows the two resource groups to work together with great, heretofore unseen flexibility. Furthermore, security features are provided whereby only QA personnel can QA-approve something, whereas only engineering can specify the engineering state information. However, if an item is removed from the product by engineering, not only does the engineering state change, for instance to "kit marshaled", but the QA state is automatically set to "false" by the system, thereby invoking another QA inspection when the item is refitted. The QA analysis is mapped to the system functions & databases as shown in FIG. 9, with a typical quality analysis flow path depicted in FIG. 10.

There can be, and preferably are, many other fields that are also stored for items at every level of the hierarchy, an advanced configuration management object schema comprising such fields, representative fields include, but are not limited to:

"EIDP/Other ref.": allows any other reference to be recorded, e.g., European companies would use this field for their "End Item Data Pack" (EIDP) numbers;

"EIDP std/iss" or "Build std/iss": some companies have a standard and issue number associated with configuration items. This field is to record, for a particular piece of hardware, the standard and issue number, at a modification level, to which that piece of hardware was built. After modifications have been applied, the integrated manufacturing intelligence of the subject invention updates this field, provided no modifications are missing. Note that the build standard shown indicates that all the design modifications up to that standard have been applied;

"Design std/iss": for companies having a standard and/or issue number associated with configuration items, this field is to record the, on-going, current design standard and issue number associated with that part number. By recording of this, and the above field, any deviations between the two can be clearly seen;

"Owner's title": the title of the item that "owns" this item, e.g., the name of the sub module that a unit is in, with such filed being set-up automatically;

"Product ref": for users building more than one of an item, e.g., building one hundred aircraft, the product reference number, e.g., aircraft #27, refers to the particular aircraft to which the unit/subsystem, etc. belongs. Once this reference number has been entered for the final product, e.g., aircraft, etc., the integrated manufacturing intelligence of the subject invention can copy it throughout the configuration tree as required;

"Status": described above;

"QA approved: described above;

"Location": describes the current location of the hardware on a "world" scale, e.g., "Lockheed Martin, San Diego";

"Position": describes the intended position of the hardware on a very small scale, e.g., "+Y Sidewall". This is particularly useful when there are several identical units being used at different positions on the product;

"Manufacturer": the name of the manufacturer;

"Abbreviation": any arbitrary abbreviation;

"Run time log" and "Total run time": these fields concern the logging of electrical operation times;

"Actual no ONs" and "Allowed no Ons": allow the actual number of electrical turn-ons to be automatically compared with an allowed number of turn-ons;

"No installs": automatically records the number of times this item has been installed on the product;

"Criticality": a decimal number indicating the importance (i.e., urgency) of the item;

"Calendar": this field selects which calendar (i.e., project work pattern) should be used in calculating the delivery due dates from the delivery lead times;

"Lead time": given a "Completion due" date for the product, e.g., aircraft, the number of days/weeks, etc. before the date that a subsystem, sub module or unit should be available for integration are delimited;

"Completion due": for the final product, e.g., aircraft, this is the date by which completion is due, the date used in the lead times calculations;

"Completed date": for the final product, e.g., aircraft, this is the date on which it was completed, a date not used in any calculations;

"Delivery due": if lead times are in use, then this date is calculated, and is the date by which the item should arrive (i.e., be delivered) to allow the product, e.g., aircraft, to be completed by its completion due date;

"DRB date" or "Received date": the date on which delivery took place. European space companies would use this field for the delivery review board (DRB) date;

"DRB mins ref" or "Delivery mins ref": arbitrary reference to the minutes relating to the DRB/delivery review;

"DRB no open items" or "Delivery no open items": the (integer) number of open items relating to the DRB, e.g. "3";

"Mass", "X coord", "Y coord" and "Z coord": detail information to allow the current and projected centre of gravity to be calculated. The units used in describing the X, Y, Z co-ordinates and planes are arbitrary, but must be consistent throughout, e.g., for satellites, centimeters from a central axis intercepting the separating plane is suggested. Similarly, the mass units should be consistent throughout, with kilograms suggested;

"Main design documents and drawings": for main components, a second screen of data is available, detailing the Main Design Documents and Drawings for the Part number being examined. The issue numbers of these documents and drawings are displayed automatically if the documents and drawings exist in the documents or drawings categories. If a document or drawing referred to here does not exist in the document or drawing categories, a row of asterisks is displayed for the issue number. Documents/drawings so referenced include: circuit functional diagram; design verification matrix; drawing family tree; equipment specification; interface control diagram; test plan; test procedure; test report; test results; top assembly drawing; and, miscellaneous main design document;

"Procedure change nos" ("PCNs"): detail the procedure change numbers for documentation;

"Total reqd" and "No issued": list the total number required, and the number issued for stock items. e.g., nuts and bolts;

"Channel no", "Connector no" and "Pins": lists the channel number, connector number, and number of pins for instrumentation; and, "Links": the links are a set of references to the children of this item, e.g., for the product, there would be a link between the product object and the, e.g., subsystem objects. These links are "one-way", from parent to child. These links allow anything to be linked to anything, except that links going up the tree (i.e. from unit to subsystem) are not allowed. Links between items at the same level (i.e. from subsystem to subsystem) are allowed. With respect to the "unit" of FIG. 7, exemplary screen shots, FIGS. 11-13, are provided from the Product Details & Structure Breakdown interfaces.

The hierarchy, links, and status fields described hereinabove are essential for facilitating a manufacturing or integration readiness analysis (MRA), more particularly, one or more of the following specific, non-limiting analyses, analyses which generally indicate points of a manufacturing readiness continuum:

"Analyze, integrated & QA approved": Checks that the specified main component, such as product (e.g., aircraft), subsystems or units, etc., is integrated and QA approved, and provides a table of items, exclusively within the specified item's constituent components tree, that do not meet that criteria. Availability of documents, drawings, compounds, fittings, etc. is also checked as necessary, and reported. Outstanding problem, quality, and other reports relating to items encountered are also summarized and presented, such that reasons for unavailability etc. may be seen and acted on;

"Analyze, integrated": As above, but ignoring QA approval flags;

"Analyze, can we test & QA approve?": Checks that the specified main component is ready for test and QA approval, and replies "yes" or "no" accordingly. A table of items, exclusively within the specified item's constituent component tree that do not meet that criteria, is generated. If subcomponents in the tree are already integrated, but not QA approved, these will also be shown in the table. Availability of documents, drawings, compounds, fittings, etc. is also checked as necessary and reported. Outstanding problem, quality, and other reports relating to items encountered are also summarized and presented, such that reasons for unavailability etc. may be seen and acted upon;

"Analyze, can we test?": As above, but ignoring QA approval flags;

"Analyze, can we mechanically fit?": Checks that the specified main component has all its subsidiary components available and kit marshaled, and replies "yes" or "no" accordingly. Note that unlike the "Can we test" analyses, this analysis looks at subsidiary items exclusively, and not at the status of the specified item, i.e., if run on subsystem X, the subject analysis checks "are all the parts available to fit to/with subsystem X?," and replies accordingly. As with other analysis, a table of items not meeting the criteria (i.e., not kit marshaled) is produced, along with a list of relevant problem, quality, and other reports indicating same;

"Analyze, generate kit marshal list": Produces a list of all the items required to integrate the specified main component, i.e., a list akin to a bill of materials. Items already kit marshaled are not shown, having previously been marshaled). Any stock/inventory shortages are highlighted (e.g., number missing) via a "status" column. Batch numbers of stock items and compounds are automatically recommended and traced in furtherance of facilitating batch traceability;

"Analyze, can we kit marshal?": Checks that the specified main component has all its subsidiary components available/delivered, including compounds, drawings, stocks, etc., and replies "yes" or "no" accordingly. The subject analysis looks at subsidiary items exclusively, and not at the status of the specified item. As with other analyses, a table of items not meeting the criteria (i.e., not delivered/available) is produced, along with a list of relevant problem, quality, and other reports indicating same;

"Analyze, center of gravity"; For the specified main component, displays the current and projected (i.e., final) center of gravity and mass. This is of use when lifting the product or subsystem, or when performing spin balance tests. The mass is also very useful when a "mass budget" has been planned, as is the case for products, e.g., satellites, that are launched into space, mass being integral to payload assessment. The subject analysis allows that weight to be determined "real-time" for the configuration currently in place, and for it to be projected for the completed product;

"Analyze, delivery lead times": For the specified product, generates delivery due dates for all the main components of the product, based on when the product needs to be built by, akin to a just-in-time analysis; and, "Analyze, non-conforming design/build standards (simplified)"; This option automatically checks that the standard specified in the "build/EIDP std" field matches the standard specified in the "design std" field for main components, and that multiple identical items (i.e., those having the same part number, but different serial numbers), have the same design and build standards. Items having non-conforming (i.e., different) standards are flagged for display, thus items requiring modification can easily be detected and displayed or otherwise communicated. Further preferred, non-limiting, application specific aspects of the "configuration and components" analysis function include: installation and removals; electrical operational times; delivery lead times; fitting kits; cross-referencing; and, earthing measurements.

With regard to "installation and removal," when building certain kinds of hardware, it is a requirement to know (for certain components): how many times they have been installed; how many times they have been removed; and, the dates & times of those installation/removals. This is because certain components must be inspected every nth install. For example, connectors to a motor may be subject to an inspection every twentieth mate/de-mate. Recording this information manually is extremely tedious, so this system takes advantage of the structure breakdown to greatly reduce the user's efforts in maintaining this information. The above analyses can be "targeted" at a specific "node" in the tree, such as a subsystem or unit (etc.). In the same way, installations and removals of equipment occurs at the "node" level too. So, to install or remove, e.g., a unit, the user specifies which unit is being installed or removed, and the system intelligently analyzes which components underneath (i.e., underlaying) that item are needing to have a status change, and will generate a list of such items. This list has several uses: it is presented to the user for confirmation of those changes; it is used to automatically change the state of those "sub-components" as required by the operation in question (i.e. install or remove); and, it is used to log the dates & times of the installations/removals, along with the user name running the system at that time. The list provided consists only of those items in the unit's sub-tree, and only of those items in a suitable state. For example, if installing a unit, and there is a fitting. e.g., a bolt, already shown as attached-installed to the unit, that bolt will not be in the list of items generated for installation.

With regard to "electrical operation times," when building certain kinds of hardware, it is a requirement to know, for certain components: how many hours they have been operational; how many times they have been powered on; and, the dates and times of operation. This is because certain components, e.g., like gyroscopes used in satellite or missile stabilization and guidance, have a limited life in terms of running time and powering on times. In many cases, this information is provided to the customer for whom the product is being built.

Again, the structure breakdown is used to determine, for the switching on of, e.g., a subsystem, which units are also being switched on. A list is generated for several purposes: it is presented to the user for confirmation of the switch on/switch off; it is used to automatically change the state of those "sub-components" as required by the operation in question, i.e., on or off; and, it is used to log the dates & times of the switch on/switch off, along with the user name running the system at that time.

Advantageously, several layers of filter are applied in generating the subject list, so as to keep the list small. First, only items (e.g. units) in the appropriate sub-tree (i.e. subsystem) are listed. Second, only items that are electrically connected are listed, missing items or items not electrically connected obviously could not be turned on. Before presenting the list to the user, a further filter is applied. Each component (e.g., subsystem, unit, etc.) has a further attribute or field, namely, "run time log" which has the following options: assume on with subsystem or product; verify on with subsystem or product; and, ignore on with subsystem or product. Components that are flagged to "Ignore . . . " are always omitted from the list. Components flagged "Assume on with subsystem or product" remain on the list, but are not shown to the user. Components marked "Verify on with subsystem or product" are shown to the user for confirmation of switch on/switch off.

A further advantageous feature of the subject invention is a fast completion system. When a list of components is offered to the user for confirmation, as in the above scenarios, the objective is to keep the list as short as possible, and to simply provide a checklist, where items can be confirmed or removed from the list with a single key stroke. The fast completion system offers this facility.

The fast completion system option, depicted in the screen shot of FIG. 14, contains menus which are relevant to the operation in question, allowing items on the list to change to one of several different states via a single key stroke or press. For installing or removing, the options are: "Integrated/ available"; "Ready-for-Test"; "Mech-fitted"; "Kit-marshaled"; "Delivered"; "Not-delivered/not-avail"; and, "QA-Approved, Yes/No." For the electrical operation times, the options are switch on, or switch off. The fast completion system then changes the object state in the product database suite, and records entries in other databases throughout the system, to maintain a consistent picture of what is happening.

The subject invention further utilizes the subject Manufacturing Readiness Analyzer, i.e., the "Product Tree Analyzer 64" of FIG. 4, in conjunction with, among other things, the structure breakdown database, to assist in determining a schedule for component delivery. This can be done in complete isolation to a project planning system, if the user so wishes. This mechanism works by having every object used to build the product having a "lead time" attribute. The lead time system assumes that the production of high technology hardware always takes a set amount of time, which can be specified, by the user, in advance. Hence by knowing the completion date for a product, it is possible to calculate the required delivery dates of equipment to build the product. The differences between the completion dates of the product, and the delivery dates of the components to the product manufacturer (i.e., the user of the system) is loosely defined as the lead time.

Obviously, when producing two hundred of an item, e.g., tanks, experience is gained from the production of the earlier models, and accurate lead times can be specified, so this facility can generate very accurate information. However, when producing lesser quantities of a product, or when sufficient experience of lead times has not yet been accumulated, the project planning system, later detailed, rather than the lead times system, should be used to generate the required delivery dates. The project planning system does not use fixed lead times for equipment production (e.g. "7 months"), but analyses the actual work required in detail, including slack, slip, etc., to produce very accurate delivery dates, which can move (i.e., shift) to allow for re-testing etc.

In order to perform lead times calculations, the system needs to have the following information: required completion date for the product, which is entered in the product's "Completion due" field; lead times, i.e., how many days/weeks/months/years there should be between this item's delivery, and the parent item's delivery, which is entered in the item's "Lead time" field; and, project calendar to use, detailing company holidays, how many hours work are to be performed each day, etc., which is entered in the product's "Calendar" field. Thus, it is then a matter of arithmetic to calculate the required delivery dates of the constituent components.

As indicated in FIG. 7, the use of "Fitting Kit" allows batch traceability to be recorded. A fitting kit object describes not only how many, e.g., ten, of a specific inventory items, e.g., an M3-hex bolt, are needed, but details the batch or batches that the ten bolts were taken from. By this means, if a component, e.g., a bolt, is found to be faulty, all the other places where bolts from that same batch have been used can be quickly identified, allowing those bolts to be replaced, or at least examined for the same fault.

Figure 15:
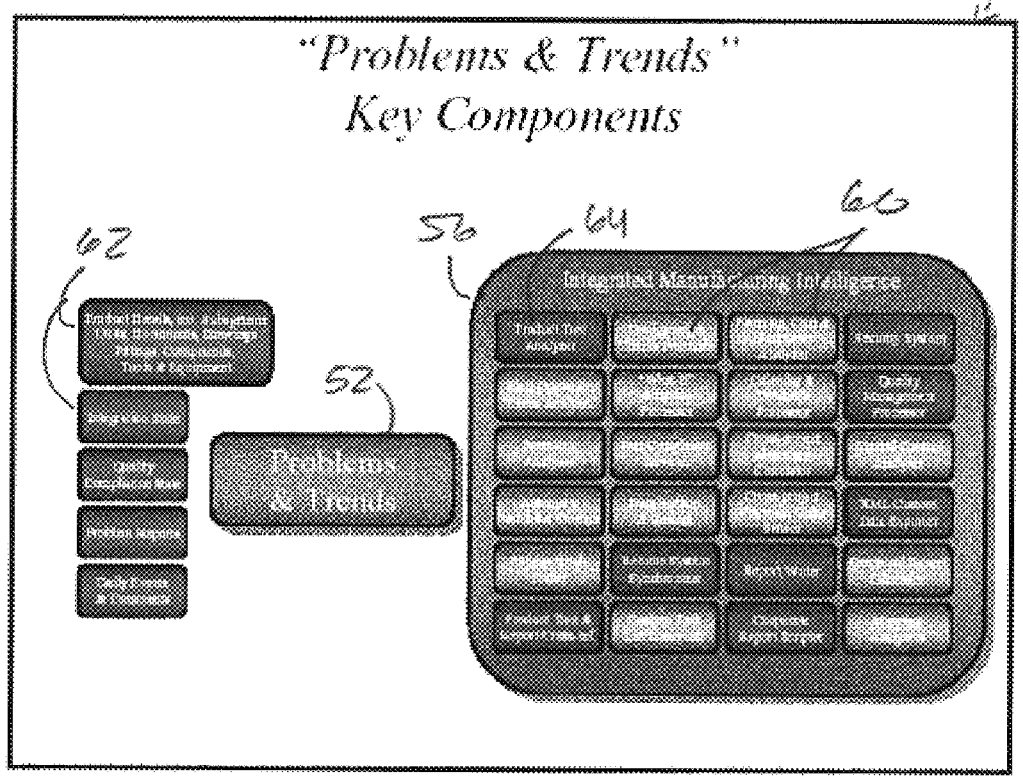
FIG. 15 depicts the processing engines and databases implicated in a problems and trends analysis.
Figure 16:
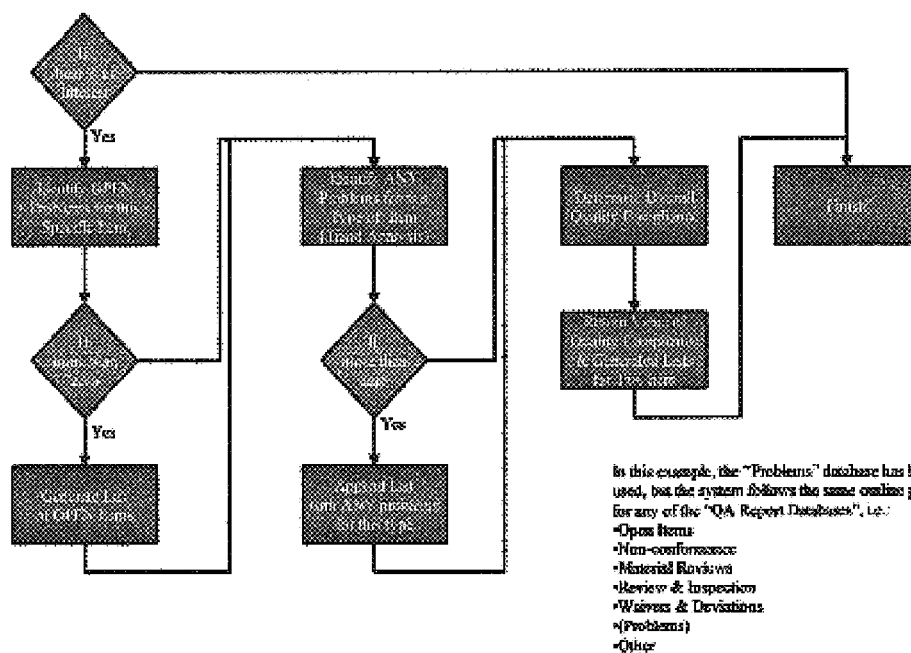
FIG. 16 illustrates a process flow for the problems and trends analysis of FIG. 15.
Figure 18:
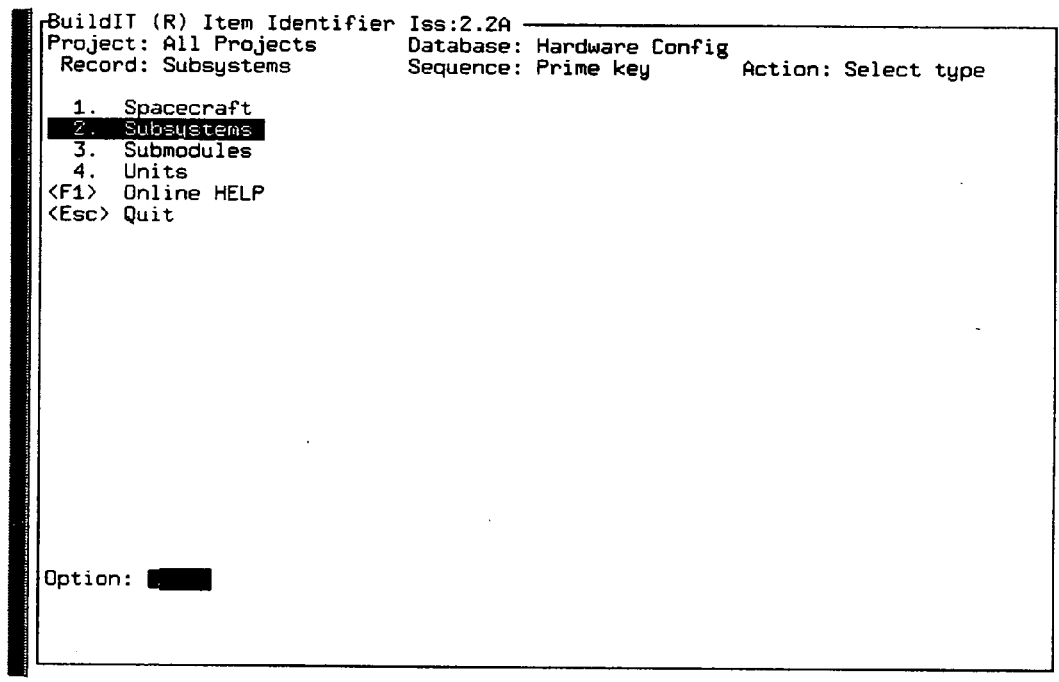

The part and serial numbers are also used to cross-reference information in other databases to information in the Product Details database. For example, problems in the problem report database are cross-referenced back to the Product Details & Structure Breakdown tree via their part and serial numbers, taking advantage the tree structure defined in the Structure Breakdown. So too are open items, waivers & deviations, material review board findings, reviews, etc. This cross-referencing means that when an analysis, e.g., "Can we Integrate?", returns "No", not only are the offending product sub-items shown to the user, if there are any, but various open (i.e., unresolved) reports are also shown to the user, in order that the reason for the "No" response may be clearly understood. This is one of the ways in which this invention provides the user with all the information needed to make decisions, (drawn from across the entire management domain), not just a part of the information needed. The key components of this system used in problem analysis are generally illustrated in FIG. 15, with an analysis flow for checking a single item shown in FIG. 16.

For most analysis functions, this invention needs to know what item (i.e., type of main component) to start the analysis from, e.g., for a "Can we fit?" analysis, the invention needs to know what we are trying to fit. This is specified as a part of the analysis, and provides the following benefit. The full suite of analyses are not just for the product as a whole, but can be run against any unit or subsystem (etc.), in isolation to the rest of the product. So the analysis can be run against a node (e.g., unit) in the structure breakdown, intelligently analyzing items below that node, but ignoring items parallel to that node or above that node. This means that information returned is very specific to the analysis question (e.g., "Can we fit?"), thus irrelevant information is very effectively filtered out.

With reference now to FIG(S). 17-21, the select analysis or interrogation is made by the user via menu selection. Thereafter, the type of item in the structure breakdown to be analyzed is determined. Next, a specific item is chosen from a list, then the analysis is started via the "Action-this" menu option. The Manufacturing Readiness Analyzer then examines the various states, especially engineering, inventory & quality, of the target item, in comparison with the type of analysis being performed. If the target item does not satisfy the criteria for the type of analysis, it is added to a list of non-conforming product items.

The Manufacturing Readiness Analyzer then examines a variety of other information specifically relating to the same target object, with respect to the whole management domain, in its entirety, including: problems; open items; non-conformance; material review board results; waiver & deviations allowed; automatic reminder logs; and, any other information throughout the entire system that could have bearing on this type of analysis.

The state of a report, log, or other object/piece of information is analyzed according to the type of analysis being run. For example, closed reports are generally ignored, but for some analyses, minor reports are ignored, whereas for other analyses, minor reports are not ignored. In the latter case, minor reports, like major reports, will be noted as non-conforming objects if they are still open, etc. Similarly, some analyses take note of QA issues, whereas other analyses are designed to ignore QA issues. Different rules apply to each kind of report object, according to the different practices of each industry and manufacturer. However, a typical set of criteria is illustrated in FIG. 22 Analysis Processing, where "yes" means that the analysis on the left of the table takes note of the information at the top of the table, and "no" means that the information is ignored. This is not an exhaustive list, but shows the most common needs of high technology industry. Other information tends to be more industry-specific in its use.

As shown, among the several columns in the table of FIG. 22, there are two sets of columns warranting further discussion, namely, Selected product, and Product sub items. The reason for these columns is that different logic is applied according to whether or not the analysis is dealing with the item, i.e., node, where the analysis started, namely, the target item. If dealing with, e.g., "Can we test & QA approve?" for items below the target item for the analysis, QA approval is required, hence "yes" in that column. However, the target item, by definition with this analysis, will not be QA approved, and thus is ignored for this analysis, hence "no" in that column. So, in summary, this is not a matter of analyzing a structure breakdown, but of bringing together all the information in a management domain that could affect decision-making for the specific task in question for the relevant part of the structure breakdown, then analyzing that.

Figure 23:
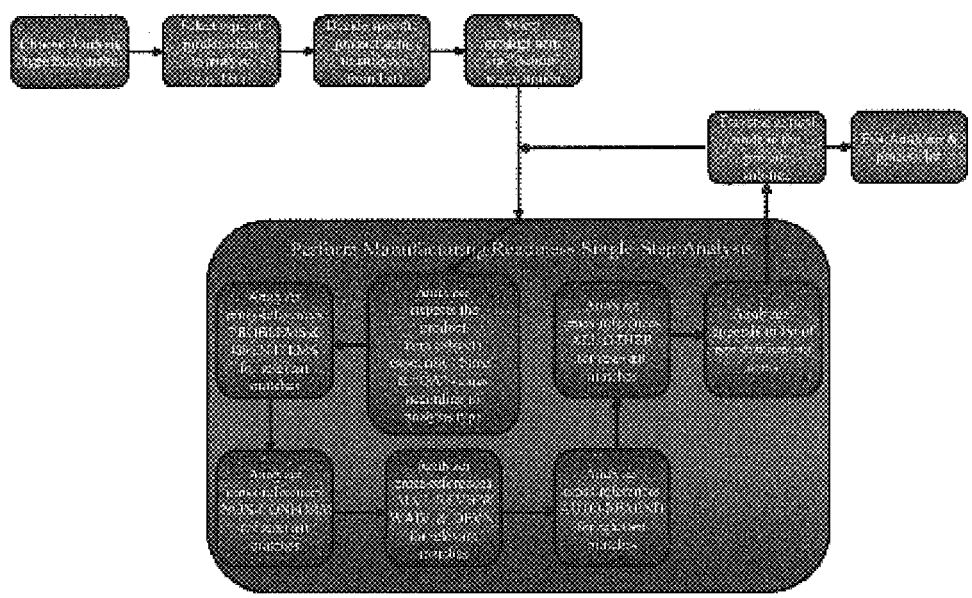
FIG. 23 depicts a process flow for the manufacturing readiness analysis of FIG. 17-21.

Illustratively, with regard to the flow of a basic manufacturing readiness analysis (FIG. 23), the analyzer reaches a node of a structure breakdown (see e.g., FIG. 24), then performs multiple analyses based on that node. The analyzer then traverses to another node, in the sub-tree of the target node, and performs another analysis. This traversal process is described by the box labeled "Traverse to next node". Inspection of a product item is depicted in the analysis flow of FIGS. 25A-25C.

For example, grossly simplified, and with reference again to FIG. 24, consider a simplified structure breakdown as illustrated. If running an analysis, e.g., "Can we Kit Marshal?", against the leftmost Subsystem (see FIG. 26), the maximum items (i.e., nodes) that would be analyzed are the two leftmost Units, plus the Documents, Drawings, Fitting Kits & "Other" that are "attached," in this case, to the leftmost Unit. A simplified generic flowchart for analyzing the Structure Breakdown Tree is shown in FIG. 27.

Figure 24:
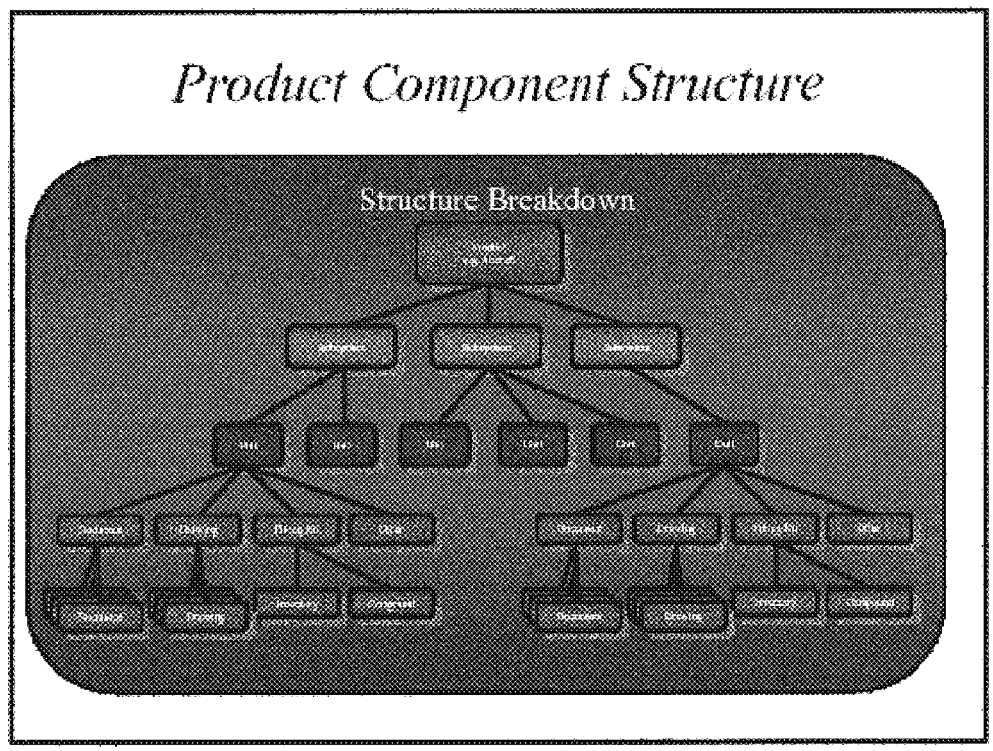
FIG. 24 depicts an illustrative product component structure for which a manufacturing readiness analysis is to be conducted.
Figure 25A:
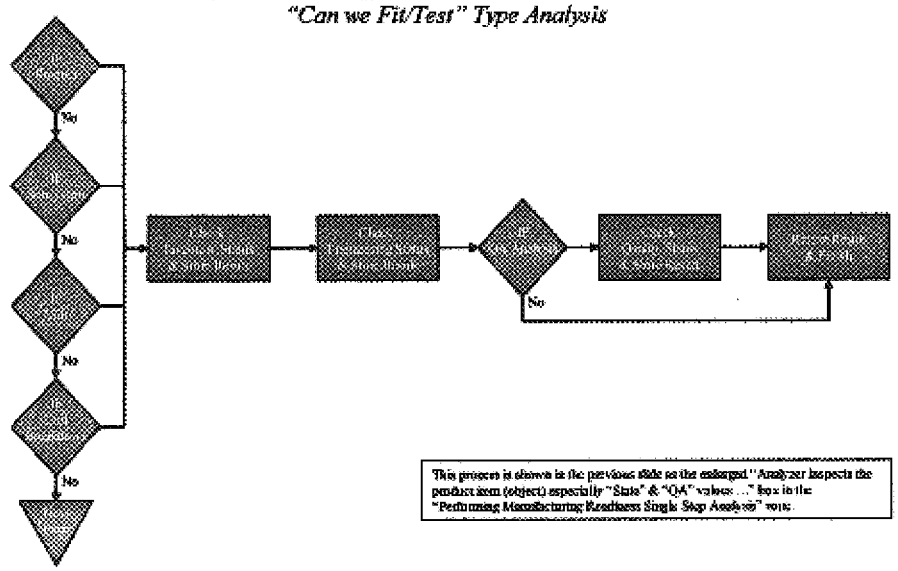
FIGS. 25A-25C illustrate the process flow a select portion of the product component structure of FIG. 24.
Figure 25B:
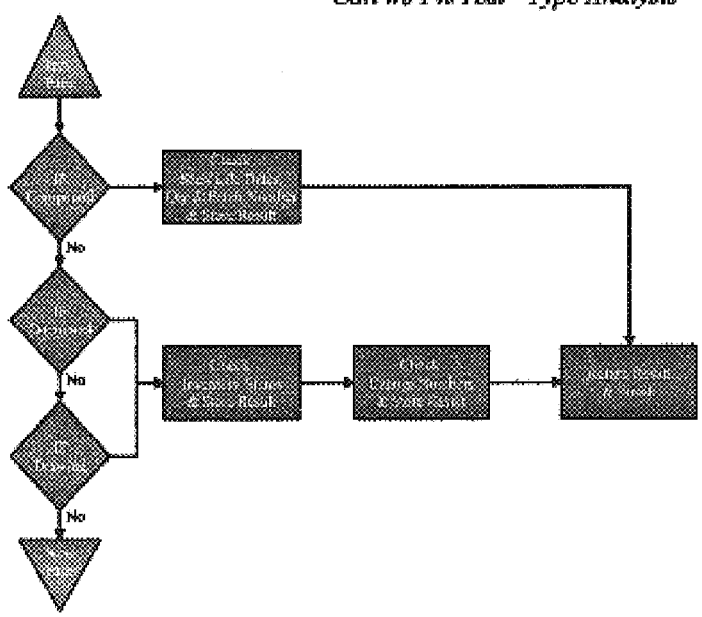
Figure 25C:
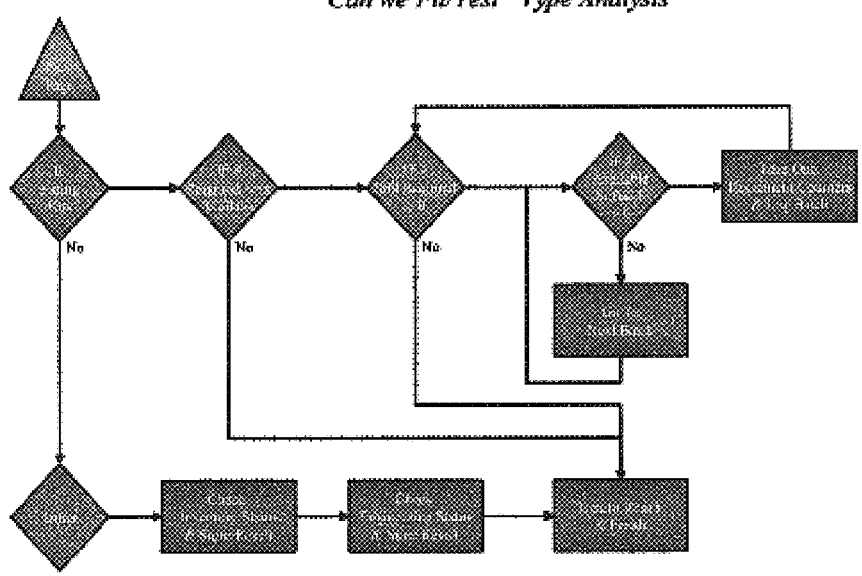
Figure 2C:
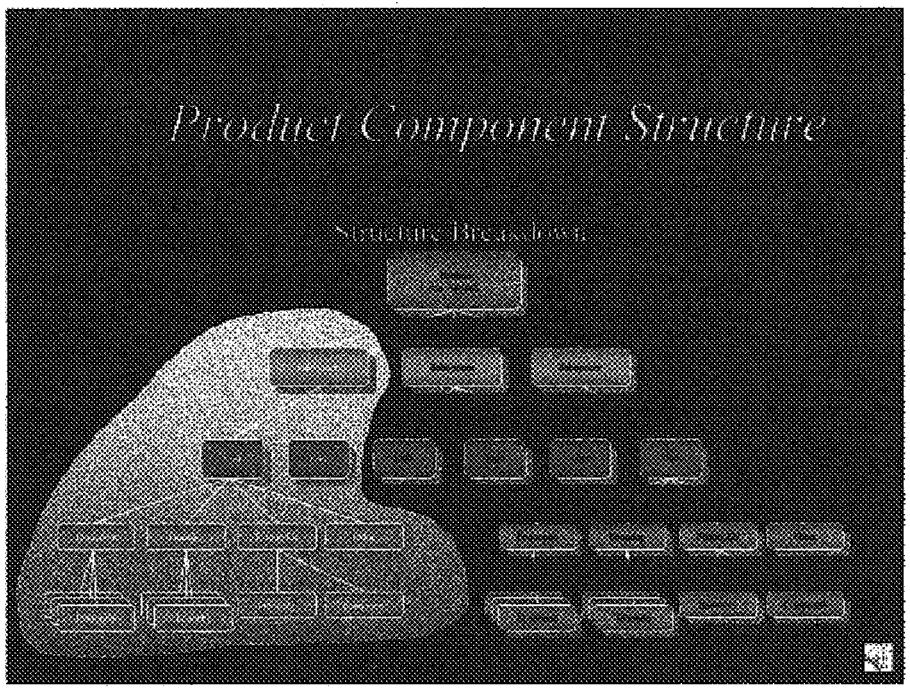

With reference to FIG. 24, the sub-tree, from the leftmost Subsystem downwards, would be traversed according to the flowchart of FIGS. 25A-25C. Analysis starts at the topmost box, "Perform Manufacturing Readiness Analysis," cross reference FIG. 23. In this example, the analysis of the Subsystem would start here. Assuming that acceleration criteria do not apply, the above traversal mechanism would next analyze the leftmost Unit, then the leftmost Document, then the leftmost sub-Document, then the next leftmost sub-Document, and continue on through all the documents. Following the flowchart, the analysis continues to the drawings, then Fitting Kits, Inventory, Compounds, & Other. The mechanism would then select the second leftmost Unit for analysis, and would then exit.

Figure 27:
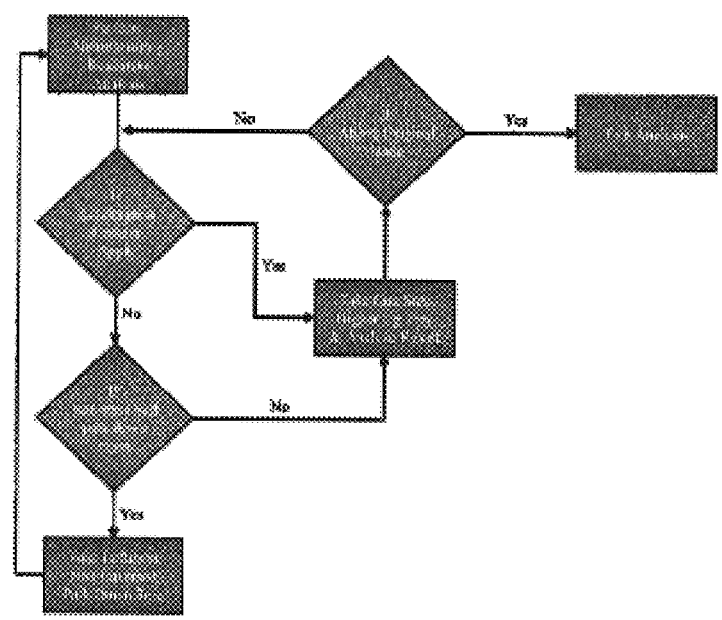
FIG. 27 illustrates the process flow for an accelerated traversal of the structure breakdown tree of FIG. 24.

With continued reference to FIG. 27, "Acceleration Criteria" apply when a certain kind of analysis does not need to go any further down the tree, because the current node already provides conclusive information. For example, consider the analysis "Can we fit?" as applied to a Subsystem. If one of two Units is already fitted, traversal down the path of the fitted Unit can be abandoned, thus saving time. However, if the analysis was "Can we fit & QA approve" on the same subsystem, the acceleration would not apply on policy grounds, because any QA approvals must exhaustively determine that there are no outstanding QA issues, which necessitates traversal to the bottom of the tree, even if the engineering information shows that everything is ready. Acceleration criteria policies can be determined on a case-by-case basis, depending on the industry & manufacturer involved. Again, it is to be emphasized that we are not just looking at the specific state of a product component, but of all the information in the management domain (i.e., in any database) relating, directly or indirectly, to that component.

As is well known, the manufacture of high technology products always involves alterations to the design of the product. These alterations cause a change in the design standard of components, etc., and are stored in this system as "Modifications". A modification normally results in a change to the design standard, and when modifications (i.e., new design standards) are applied to equipment, this change is reflected in the equipment's build standard.

The system of the subject invention records and analyses changes to the design and build standards, to produce a list of missing modifications, modifications applied, modification costs, standard baselines, etc., for the components, and for miscellaneous parts, of a product or subsystem etc.

Figure 28:
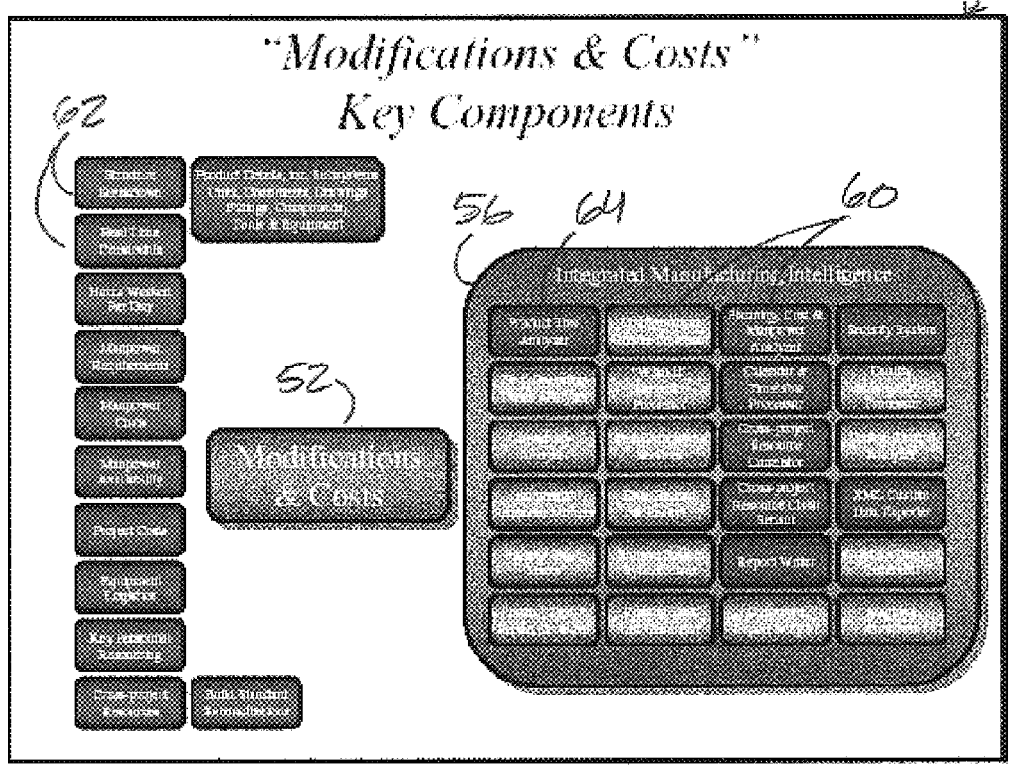
FIG. 28 depicts both the processing engines and the databases implicated in furtherance of a modification and cost analysis.

As shown in FIG. 28, the "Build Standard Reconciliations" database essentially represents: the design standards database; the build standards database; and, the build and design standards reconciliations database. Information on the design standard is stored in several places. The "Product Details" database documents the current design standard, whereas the "Design modifications" database documents a full history, for every component of the product, of: what the standards were; when they changed; why they changed; and, the various costs of applying such modification.

Similarly, information on the build standard is stored in several places. The "Product Details" database documents the current build standard of every component, whereas the "Build Standards" database holds a record of: what modifications were applied; what components they were applied to; and, when they were applied, etc. These three databases, "Product Details," "Design Standards," and "Build Standards," can be automatically correlated by this system to generate a database containing a cross-referenced list of, for every piece of equipment: what is the current build modification level; what design modifications have or have not been applied; what those missing design modifications do; what they cost, etc.; comparison of design to build standard; and, comparison of build standards to pre-defined baselines. Thus a comprehensive build standard reconciliation system is provided.

To enable the above functionality, the following schema is preferably, but not necessarily, used for the design and build standard modifications objects:

"Ref item type": type of item, e.g., main component, to which the modification applies;

"Part/Id number": the part number to which the new design or build standard applies;

"New std/iss" or "Mod. std/iss": the modification design or build standard. A typical format for this information would be 102/3;

"Sequence no": this is a special field to allow a "dummy" modification to be raised without any change to the standard. For example this field is used when automatically logging a design baseline, only a comment is required, not necessarily a whole new standard. The use of baselines allows differences between a formerly approved standard and the actual build standard to be very quickly identified, irrespective of what changes may have occurred to the design standard since the baseline was established;

"Title": the title of the referenced item;

"Owning subsys": the descriptions of the owning subsystem of the cross-referenced item;

"Initiated by," design standard only: shows who initiated this modification, a submenu is used, typically indicating "Contractor", "Prime" or "Other";

"Change request" or "Request number," design standard only: reference number for the modification request;

"Change note" or "Mod. no," design standard only: reference number for the modification, i.e., the modification number;

"Cha.appr.CR/CN" or "Mod. approved," design standard only; abbreviation for "Change approved-Change Request/Change Note," or simply, "Modification approved," with fields being either "Yes", "No", or "N/A";

"Implement.date" or "Design imp. date," design standard only; design implementation date, i.e., date on which the new design standard came into effect;

"Models affected" or "From prod. ref," design standard only: for space applications, the models which are affected by this change, or for other industries, the product reference, e.g., aircraft 20, from which this change takes effect;

"Cost in isol.," design standard only: approximate cost of the modification if carried out in isolation to any other work, the cost figures applying to the modification of a product some time after production/delivery to customer;

"Cost in refit," design standard only: approximate cost of the modification if carried out during a major refit, or major service;

"Cost oth.work," design standard only: approximate cost of the modification if carried out with other work, not necessarily a major refit;

"Date applied," build standard only: the date on which a modification was applied to the hardware, changing its build standard; and, "Recon comment" or "Mod. desc.": the modification description (i.e., reconciliation comment) describing the modification between the old and new standards, e.g., "Additional earthing strap specified in design", or "Test procedure now at issue 2 following problem report EMU/2301," etc.

Because the volume of information applicable over time could be overwhelming, the system described herein allows the creation of arbitrary baselines, such that at key points of the production, a new baseline can be established, and only information that deviates from the baselines is reported. This greatly reducing the volume of information presented from those points onwards.

Shifting now to project management analysis, heretofore, systems for managing manufacturing start with a project plan, and add other parts to that. The subject management domain is different, it does not depend on the project plan for management. The subject integrated manufacturing management system and management domain described do not require a monitoring technology, as the subject invention is primarily directed to a controlling technology. Even the delivery-times scheduler works without a project management system. Be this as it may, a project management feature nonetheless adds value to the overall mechanism, the following description outlines how that capability has been added to the system already described.

To truly integrate that capability, a new approach has been taken, of imbedding link points within the project plan, that allow all the integrated manufacturing information in the entire management domain to be intelligently and automatically referenced by a planning system.

The subject project management functionality permits not only a review and assessment of resources, and/or isolated bits of information, information typically flagged by "dumb" milestones in known systems, but a review and assessment of the key results sets resulting from intelligent analyses from across the management domain in its entirety. Such analysis is then used to determine the optimal path through the project plan.

Prior to further discussion of the project management functionality of the subject system, a brief description of networks, more particularly, network structures is provided. Networks can be contained within other networks, almost without limit. This is because a network is constrained to have a single start point, and a single finish point. This allows the network to be summarized by a single object, e.g., activity, by the network it belongs in. This network object behaves in the same way as a regular activity object within a network, so nesting networks does not change the behavior of the system.

Figure 29:
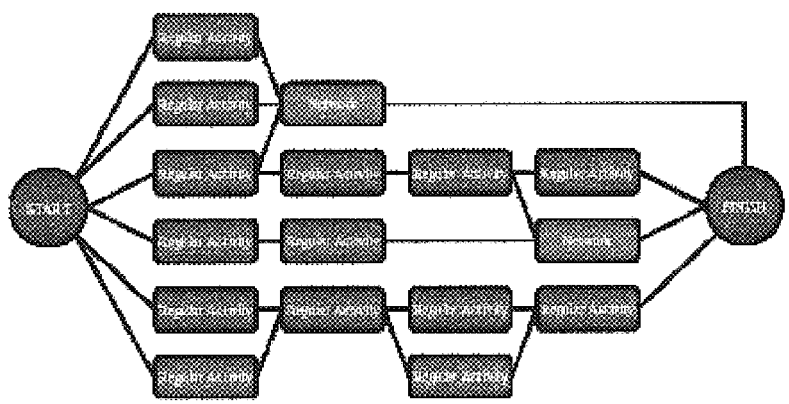
FIG. 29 depicts a planning network structure integral to the project management functionality of the subject invention.

By using an integer number to uniquely identify every network, over 4,000,000,000 networks can be resident in a single database. These networks could be nested one within-another, if a user so chose, down to a depth of over 4,000,000,000. Each network can contain over 4,000,000,000 other networks or activities. The use of a single entry & exit point, see FIG. 29, more particularly, start and finish, removes the constraint of many other project scheduling systems of only supporting nested activities to a depth of six or nine.

In a typical project plan, work starts on an activity, but may have to shift to another activity, owing to, e.g., work-force dependencies, equipment problems, etc. A scheduler like Microsoft Project® either assumes that work is still proceeding, or allows the activity to be split. As is readily appreciated, as work stops and starts multiple times, and an activity becomes split several times, the plan becomes unwieldy and inaccurate.

With regard to the present approach, the schedule accurately reflects the outstanding work, without the need to split or rearrange activities, because the scheduler looks at the percentage complete, and does not assume that work is still in progress. Thus an activity where work is halted shows the same % complete day after day, so the subject planning scheduler assumes that there is still: ((100%–% complete) *expected duration) work outstanding for this activity.

Furthermore, the subject approach allows tasks to be started without the preceding tasks being completed, so work can be performed out-of-sequence, without the need to split activities. This allows for situations where activities were shown as following one another, not because of a need for the preceding ones to be complete, but because of a resource constraint (i.e., there was only one test chamber available). Incidentally, it is further possible, and advantageous, to define an activity that cannot be worked on without the preceding activities being complete or started, etc.

Figure 31:
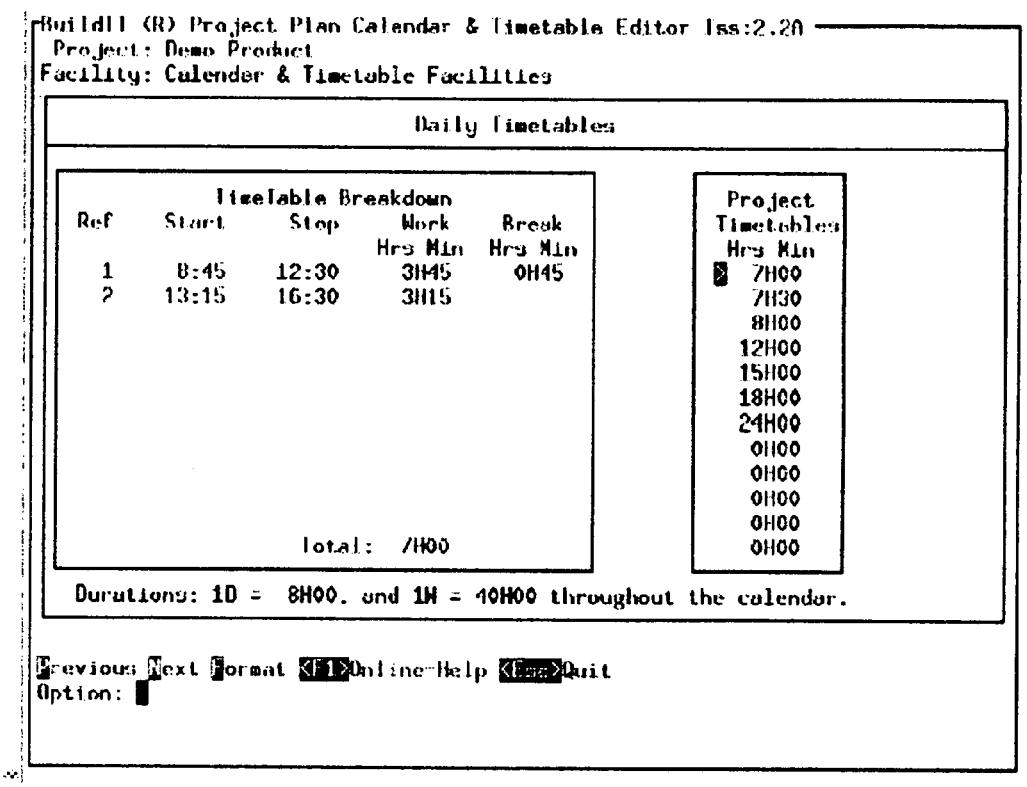

The project management component of the subject invention includes, among other features, a "Calendar & Time-table" facility (FIGS. 30 & 31) which permits the number of hours to be worked on any day to be specified, along with the times for that work to be performed. So, a particular day may have eight hours of work, from 8 am to 5 pm, with one hour for lunch at 11:30 am. Another day may be shift work, with two or three shifts in operation. Work will only be scheduled to occur during the defined work dates & times.

Figure 33:
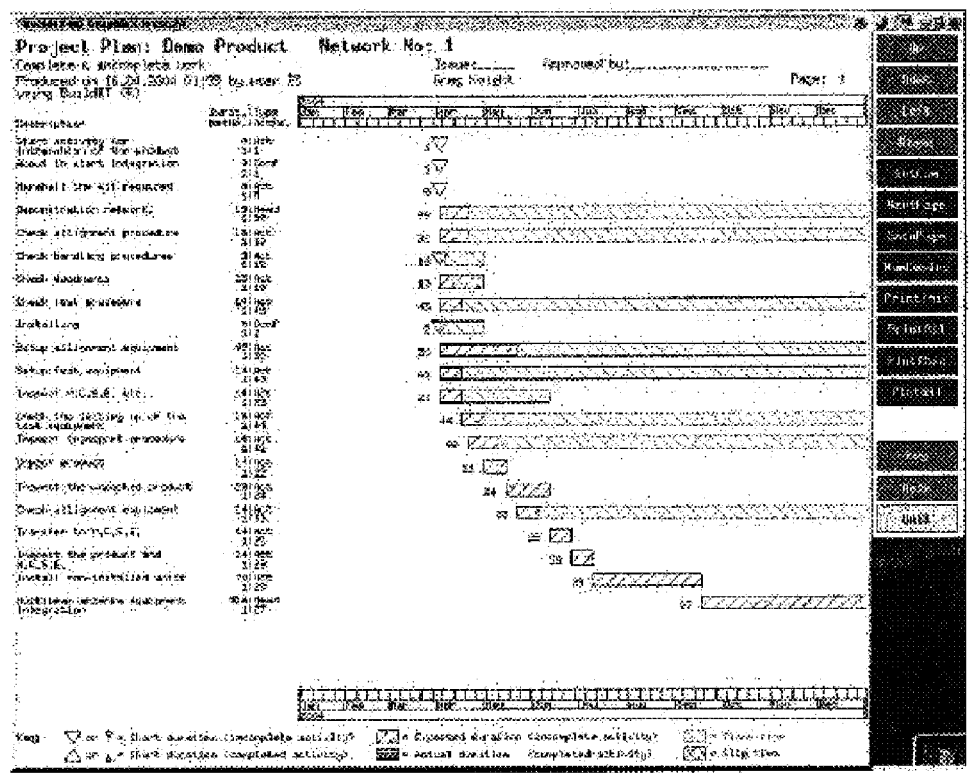
Figure 34:
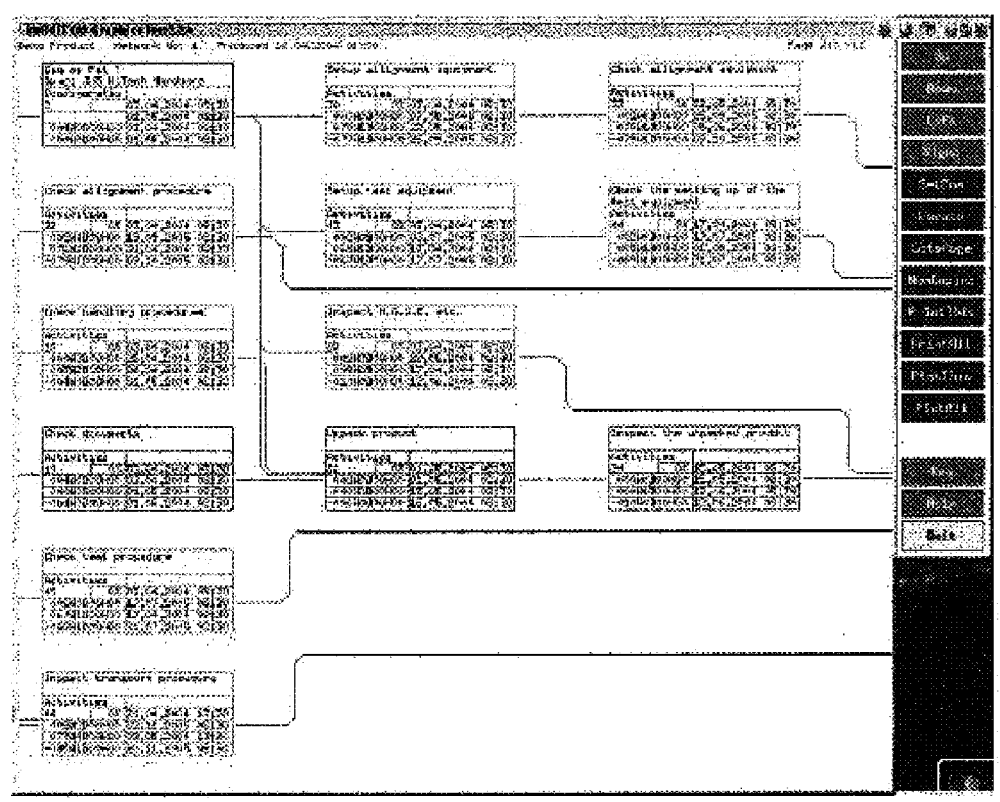

As with common planning systems, an activity can have: a constrained start, i.e., can't start before a given date; and/or, a constrained finish, i.e., can't finish later than a given date. Use of the following schema, used by regular activities and networks, enables the aforementioned features, see FIGS. 32-34 wherein an activity editor, barchart, and network diagram are shown:

Owning network number: number of the network that owns this activity;

Activity number: number of this activity within the network;

Description: description of the task, e.g., "prepare test chamber";

Expected duration: in weeks, days, hours & minutes;

Actual duration: in weeks, days, hours & minutes, entered by the user, thereby allowing work on the activity to start & stop, while maintaining accurate information for future projects;

Date started: the date and time on which the work commenced;

% Complete: the amount of work done towards completion of the task;

Date completed: the date and time on which the work was completed;

Constrain start: date and time before which the activity cannot start;

Constrain finish: date and time by which the activity must be complete;

List of fixed resource categories (and their requirements), e.g., a mechanical fitter may be a fixed resource, and an activity may require a decimal number of these, e.g., "2" would mean that two mechanical fitters are required throughout, "0.25" would mean that a mechanical fitter was required for a quarter of the activity, etc.;

Additional fixed price: allows an additional cost to be associated with the activity, in addition to the manpower costs;

Work package number: describes what work package the costs are to be billed against;

Comment: miscellaneous comment;

Preceding links: lists the activities which immediately precede this one;

Following links: lists the activities which immediately follow this one.

The following fields of the schema are automatically calculated:

Early start date: the earliest date on which the activity is expected to start;

Late start date: the latest date on which the activity is expected to start;

Early finish date: the earliest date on which the activity is expected to finish;

Latest finish date: the latest date on which the activity is expected to finish;

Slack: the difference between the latest and earliest finish dates; and,

Slip: the delay, in weeks, days, hours & minutes, to the overall project (i.e., critical path) caused by finishing an activity late.

Figure 35:
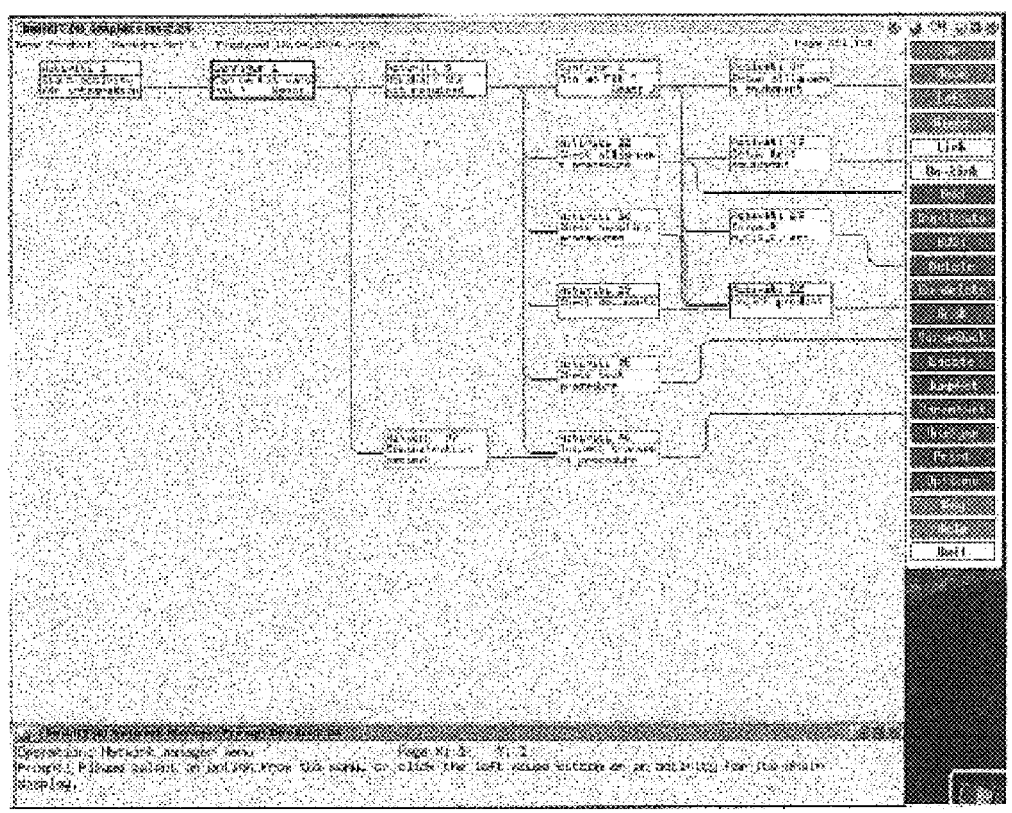
FIG. 35 depicts the intelligent network manager of the subject system.

The subject system also allows complete networks of plans to be defined graphically, like CAD for planning networks, see the intelligent network manager of FIG. 35. Furthermore, the subject system permits libraries of networks to be maintained, such that common (i.e., repetitive) processes, e.g., like installing a "unit," can simply be copied from the library without the need to create (i.e., recreate) a new network every time.

Referring again to FIG. 35, a menu, figure right, offers many more features than the menus on the display facilities, including the ability to: display & edit chains between activities and networks; manage activity & network information; duplicate activities and networks; store activities and networks in a "Scrapbook" for later use; navigate from one network to another (i.e., to a "child" or "parent" network); and, analyze networks within the editor so as to immediately see the critical path, slack, slip, etc. The network manager also has the intelligence to create dummy activities to handle certain editing complexities automatically. These include exceeding the maximum number of "fan in/out" activities, and other editing scenarios where the creation of dummy activities is the only solution to changes to the network design. Note also that there is a window at the bottom of the display entitled "Network Manager Prompt Box". This continually guides the user through the step wise functionality.

As previously noted, the manpower cost system of the subject system advantageously includes several components.

First, for every activity, the manpower needs of that activity are described within the activity. So an activity such as "Fit unit X" may require two mechanical fitters, one electrical engineer, and a QA engineer for one quarter of the duration of the activity. The activity also contains details of the work package funding the activity.

Second, a costs database holds information on the costs (i.e., rate) of, e.g., a mechanical fitter, an electrical engineer, and a QA engineer. These costs may change with time, so the costs database allows those costs to be specified from a certain date. The start date of the activity is used to calculate which set of rates should be used, and costs can then be calculated, and logged against the specified work package. Thus the project manpower costs can be predicted and categorized according to work package number.

Figure 36:
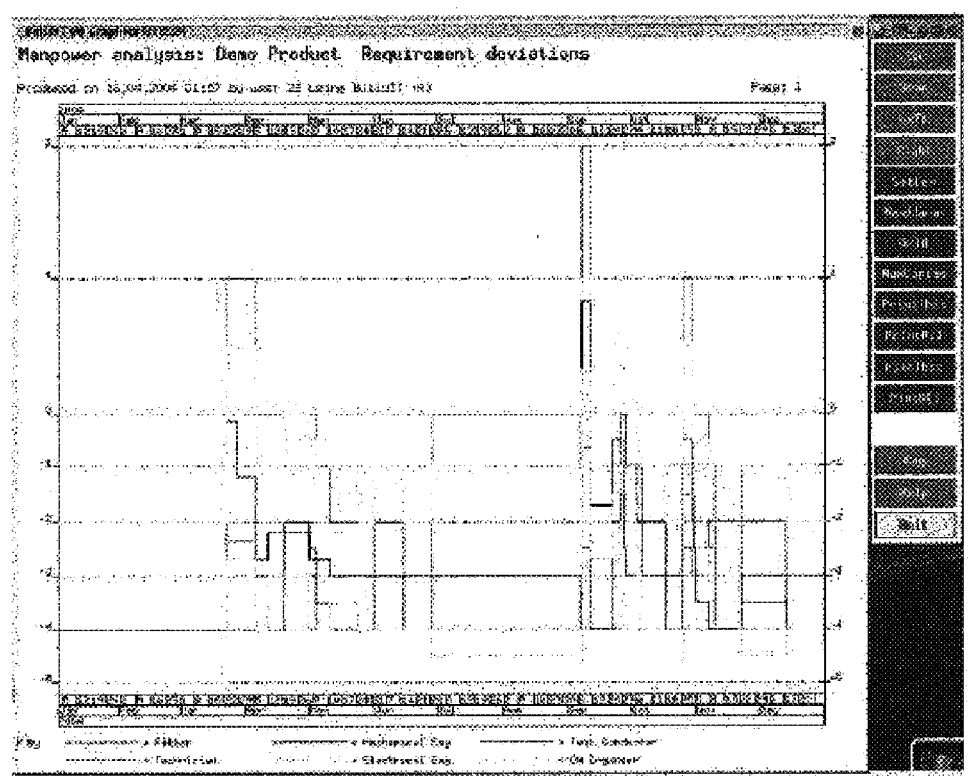
FIG. 36 depicts a display of an illustrative manpower utilization report in the context of the project management functionality.

Furthermore, since the actual duration is recorded for the activity, the expected versus actual costs can be calculated, along with the % increase/decrease, etc. This is extremely useful for budgeting. An illustrative screen shot associated with the manpower utilization analyzer, showing how the fixed categories of manpower are under/over utilized throughout the project, is provide as FIG. 36.

Figure 37:
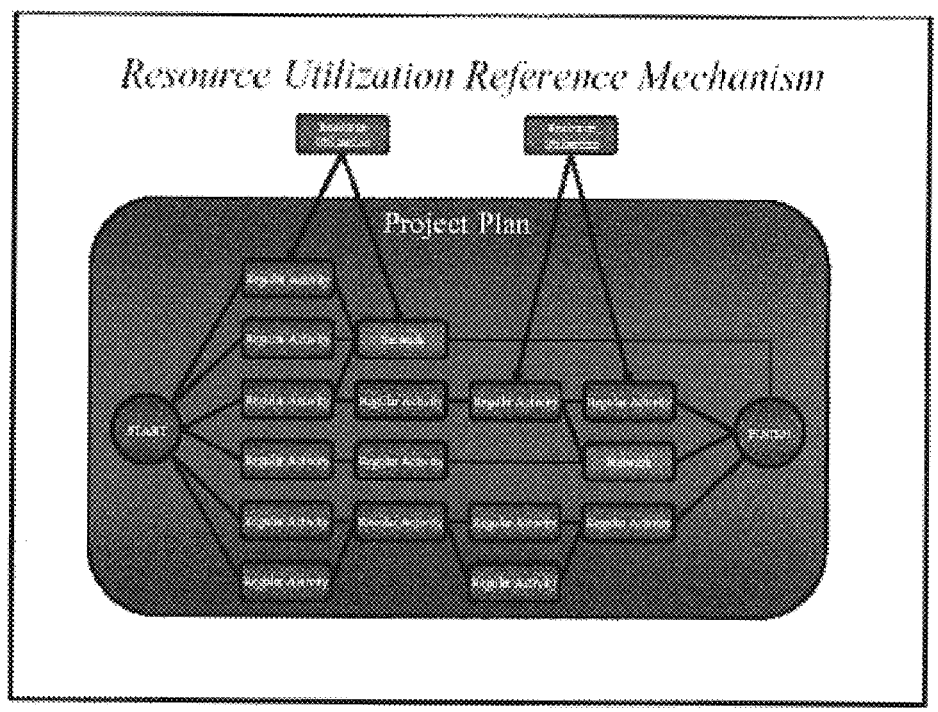
FIG. 37 depicts the resource utilization reference mechanism in the context of the planning network structure of FIG. 29.

With reference now to FIG. 37, resource objects can exist outside of the project plan, in that the activities of the project plan do not link to or from them. These resource utilization objects have a one way reference to the appropriate activities, and those activities may span several networks, if needed. As depicted, a resource may be required in time to start a regular activity, and is released after a sub-network is complete. Similarly, a resource may be needed before a regular activity, and released after a different activity.

By compiling the dates and times, from references to the project plan dates and times, that resources are needed, tables are created showing, for every resource, where it is needed, when it is needed, and for what purpose. If the same resource is needed in several places at one time, a change to the schedule is needed, or another suitable resource should be acquired. Not only can resource utilization within a project plan be easily scheduled by this mechanism, but resource utilization across totally different projects & plans can also be correlated. This is important where sharing resources between unrelated projects.

Resource utilization objects have the following preferred, non-limiting object schema:

Logistic number: a unique number (i.e., integer) for this resource use;

Part number: part number of the resource, e.g., a piece of test equipment, a facility, or even a specialist person, required;

Serial number: serial number of the resource required;

Acquire for activity: the reference to the first activity that the resource is needed for;

Location: physical location in the world, e.g., city;

Purpose: general description of the use of the resource at this time, e.g., "Pre-launch preparations";

Release after: the reference to the last activity that the resource is required for, e.g., the same as the activity it is acquired for, or it could be several activities later;

Date acquired: record of the actual date acquired;

Date released: record of the actual date released; and,

Comment: miscellaneous comment.

In order for certain types of work to be performed, the product, e.g., aircraft, must be in a particular state or condition, e.g., for electrical or mechanical tests, all the appropriate units should be fitted and operational, etc. The subject invention allows special types of tasks to be inserted into any point of the project plan. These tasks, called "configuration checks," define the standard of product configuration that is required before work may proceed. Analyses are executable with respect to the current configuration management tree to verify that the required configuration is available. An example of this would be a configuration check to verify that all units of a certain subsystem were integrated and, optionally, QA approved before integrating a related subsystem.

Although many project management systems can verify that a resource is available, the subject invention can launch a comprehensive analysis, pointed at any point in the structure breakdown tree, and analyze the various states, e.g., engineering, inventory, QA, etc., not just of that item, but of all the items beneath it in the tree. Then, using the cross-referencing features, the states of objects that refer to that object, or objects in that object tree, from anywhere in the management domain e.g., such as problem reports, can also be interrogated. As such, any related unresolved problem reports or open items, etc. are highlighted in order to give the user all the information required to decide whether or not, or how, to proceed.

The use of the configuration check feature results in an overall reduction in the size of the project plan of approximately 25%, yielding higher quality and reliability of the information. The size reduction is because, e.g., ten milestones in a traditional plan, each requiring manual confirmation, have been replaced by a single configuration check which has automatic confirmation via the analyses.

As should be readily appreciated, there are several different kinds of configuration checks that can be integrated into the project plan, e.g., "Integrated and QA approved"; "Integrated"; "Can we test and QA approve?"; "Can we test?"; "Can we Fit?"; "Can we Kit marshal?"; "Write h/w delivery due"; and, "Read h/w delivery due." The effect of the first six of these checks is exactly the same as described earlier for the analyses of the product configuration management tree. The effect of the "Write h/w delivery due" and "Read h/w delivery due" checks is described below.

The "Read h/w delivery due" check causes the project planning system to take (i.e., read) the "Delivery due" date from the Configuration Management system, and use it in the project plan. This means that delivery dates specified in the Configuration Management system, either by the delivery lead times analyzer, or entered manually by the user, can be used when analyzing the project plan: the project plan will try to allow for the delivery dates found in the Configuration Management database.

Figure 38:
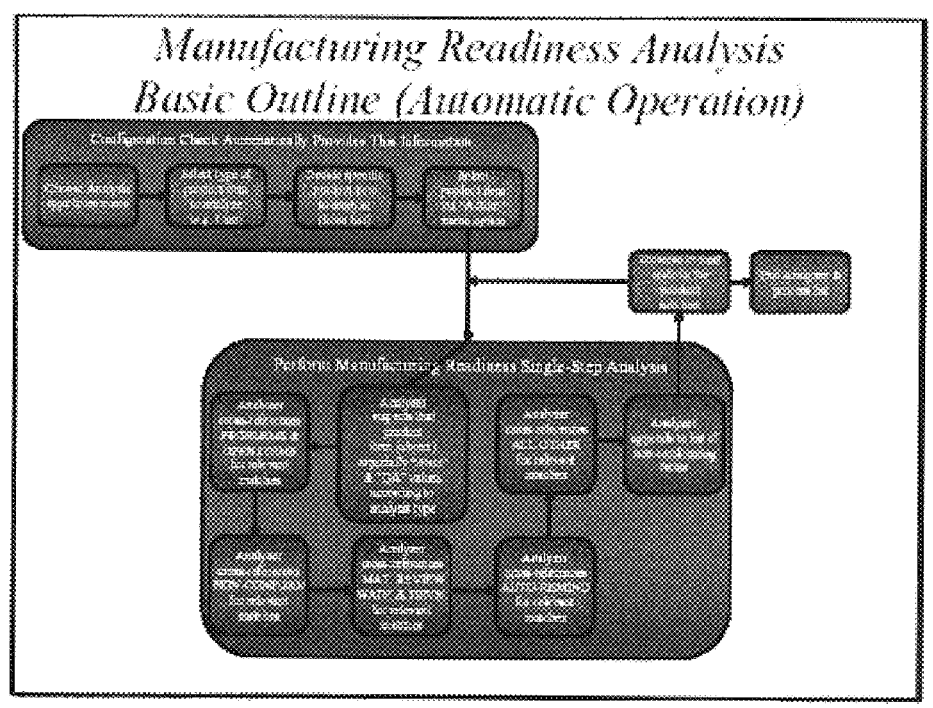
FIG. 38 depicts an automatic manufacturing readiness analysis flow utilizing the configuration check function of the subject invention.

The date read is treated as a constrained start date (i.e., "Delivery due" date for subsystems and units) or constrained finish date (i.e., "Completion due" date for products) in the configuration check. Hence, the project plan can allow for the real-time constraints specified in the Configuration Management system. The "Write h/w delivery due" check causes the project planning system to inform (i.e., write to) the Configuration Management system the date when a main component is due (i.e., required) for delivery, according to the project plan. When a delivery lead times analysis is run, this date is put into the "Delivery due" or "Completion due" field in the Advanced Configuration Management database. The embedded Configuration Check contains the key pieces of information shown in FIG. 38 to allow the Manufacturing Readiness Analysis to proceed.

Figure 39:
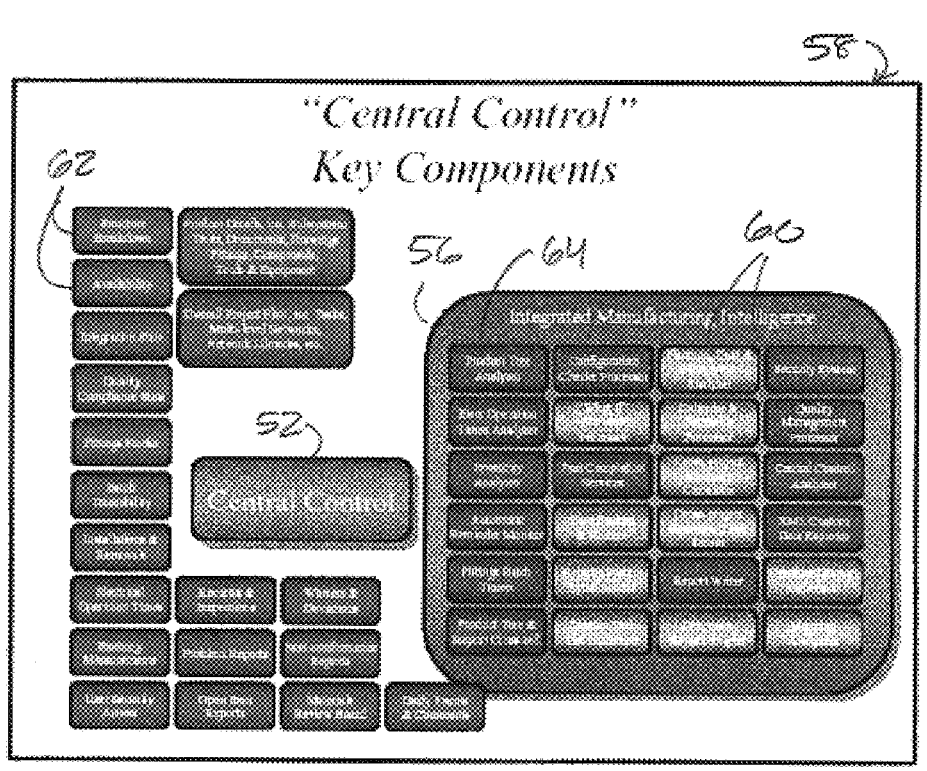
FIG. 39 depicts both the processing engines and databases implicated in a central control analysis.

A central control analysis function is also provide as part of the preferred management domain (FIG. 2), with key, non-limiting components shown in FIG. 39. The central control system (FIGS. 40 & 41), which is accessible from the main menu, allows all the most-frequently used components of the system to be accessed via a single menu. It allows a user to establish a reference to a particular item in the product structure breakdown tree, then uses that item as the referenced item for all the subsequent menu choices, e.g., install, switch on, etc.

Figure 42:
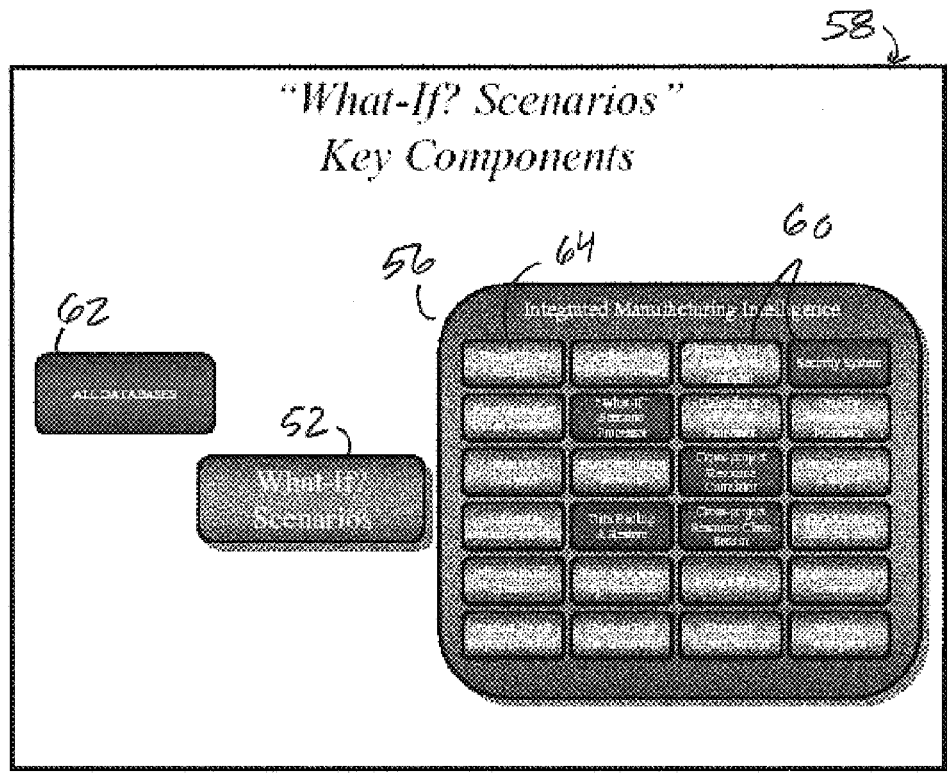

A final analysis function of the library of analysis functions for discussion is the "What-If?" function, key, non-limiting components shown in FIG. 42. The "What-If?" system creates a replica of the project databases as a temporary project, thus permitting that temporary or "dummy" project to be used to change any parameters, and see the results (i.e., cause and effect). Information (e.g., changes) can then be merged from the "What-If?" project back to the real project, etc.

There are other variations of the subject invention, some of which will become obvious to those skilled in the art. It will be understood that this disclosure, in many respects, is only illustrative. Changes may be made in details, particularly in matters of shape, size, material, and arrangement of parts, as the case may be, without exceeding the scope of the invention. Accordingly, the scope of the subject invention is as defined in the language of the appended claims.

What is claimed is:

1. A computer implemented management domain for facilitating advanced technology system integration of subsystems, each comprising at least a single unit, in furtherance of building a product comprising the integrated subsystems, said management domain comprising:
   a. an integrated manufacturing intelligence comprising a plurality of functional processing engines for select processing of information;
   b. databases accessible by said plurality of functional processing engines, said databases comprising at least a portion of said information; and,
   c. analysis functions selectable from a library of analysis functions, selection of analysis functions from said library of analysis functions implicating select functional processing engines of said plurality of functional processing engines, and related databases, so as to determine a readiness of product dependent items of the product in furtherance of establishing and re-establishing a preferred integration path.

2. The management domain of claim 1 wherein analysis functions of said library of analysis functions are user selectable.

3. The management domain of claim 2 wherein analysis functions of said library of analysis functions are auto selectable.

4. The management domain of claim 2 wherein select analysis functions of said library of analysis functions are auto selectable.

5. The management domain of claim 3 wherein said databases include a product breakdown database comprising hierarchical relationships between objects of said product breakdown database.

6. The management domain of claim 5 wherein said product breakdown database further comprises non-hierarchical relationships between said objects of said product breakdown database.

7. The management domain of claim 5 wherein said product breakdown database includes linkages from a specific database object to one or more other specific database objects of said objects of said database.

8. The management domain of claim 5 wherein said product breakdown database includes associations between said objects of said product breakdown database.

9. The management domain of claim 8 wherein each object of said objects of said database includes a status field.

10. The management domain of claim 9 wherein said database objects include said product dependent items of the product.

11. The management domain of claim 10 wherein said hierarchical relationships are presented as a tree structure.

12. The management domain of claim 11 wherein said tree structure represents said product dependent items of the product.

13. The management domain of claim 12 wherein said product dependent items of the product comprise items selected from the group consisting of compound(s), document(s), drawing(s), fitting kit(s), stock, instrumentation, inventory, miscellaneous, and/or other.

14. The management domain of claim 7 wherein said databases include a product details database containing information pertaining to said objects of said product breakdown database.

15. The management domain of claim 14 wherein said information for said objects of said product breakdown database comprises at least a part number identifying each type of item of the at least a single unit of each of the subsystems of the product comprising the integrated subsystems.

16. The management domain of claim 15 wherein said information for said objects of said product breakdown database further comprises a part number identifying each single unit of the at least a single unit of each of the subsystems of the product comprising the integrated subsystem.

17. The management domain of claim 16 wherein said information for said objects of said product breakdown database further comprises a part number identifying each subsystem of the subsystems of the product comprising the integrated subsystem.

18. The management domain of claim 15 wherein said information for said objects of said product breakdown database further comprises at least a serial number uniquely identifying said item of the at least a single unit of each of the subsystems of the product comprising the integrated subsystems.

19. The management domain of claim 9 wherein said functional processing engines comprise an integration readiness analyzer.

20. The management domain of claim 19 wherein said integration readiness analyzer accesses said product breakdown database so as to assess interrelationships between said objects of said product breakdown database relating to a target item for which a readiness status is sought.

21. The management domain of claim 20 wherein said integration readiness analyzer further accesses remaining databases of said databases accessible by said plurality of functional processing engines for information relating to said target item for which a readiness status is sought.

22. The management domain of claim 21 wherein said integration readiness analyzer interrogates said hierarchical and non-hierarchal relationships, said associations, and said status fields of said objects of said product breakdown database.

23. The management domain of claim 22 wherein said interrogation yields a selection of a manufacturing readiness condition from a manufacturing readiness continuum.

24. The management domain of claim 23 wherein said interrogation proceeds with respect to a select node of a hierarchy of said hierarchical relationships between said objects of said product breakdown database.

25. The management domain of claim 23 wherein said interrogation proceeds with respect to the product.

26. The management domain of claim 23 wherein said interrogation proceeds with respect to a select subsystem of the subsystems of the product comprising the subsystems.

27. The management domain of claim 23 wherein said interrogation proceeds with respect to a select unit of the at least a single unit of the subsystem of the subsystems of the product comprising the subsystems.

28. The management domain of claim 14 wherein said data bases further comprises a project plan database containing linkages of objects thereof to objects within select databases of said databases.

29. The management domain of claim 21 wherein said select databases of said databases comprise said product breakdown database.

30. The management domain of claim 22 wherein said select databases of said databases further comprise said product details database.

31. The management domain of claim 21 wherein said functional processing engines further comprise a planning, cost and manpower analyzer.

32. The management domain of claim 24 wherein said planning, cost and manpower analyzer interrogates a plurality of networks in furtherance of conducting work flow analysis.

33. The management domain of claim 25 wherein said planning, cost and manpower analyzer interrogates said project plan database.

34. A computer implemented management domain for controlling the production of low volume advanced technology articles of manufacture, said management domain comprising:
  a. an information library comprising a plurality of databases, databases of said plurality of databases each including objects of an object schema, objects of said objects of said object schema of any one of said databases being linked to dependent objects of objects of an object schema of another of said any one of said databases;
  b. an integrated manufacturing intelligence comprising a plurality of processors for processing data of databases of said plurality of database; and,
  c. an interrogation network comprising a plurality of analyzers, each analyzer of said plurality of analyzers executable with regard to an advanced technology article of manufacture and/or any object of said objects of said object schema of said databases, said each analyzer implicating at least a single select processor of said plurality of processors, said at least a single select processor of said plurality of processors accessing said information library in furtherance of conducting a select analysis with regard to the advanced technology article of manufacture and/or components thereof.

35. The computer implemented management domain of claim 34 wherein said plurality of databases includes an article component database comprising a hierarchal breakdown of the components of the advanced technology article.

36. The computer implemented management domain of claim 35 wherein analyses are conducted with respect to select points of said hierarchal breakdown of the components of the advanced technology article.

37. The computer implemented management domain of claim 36 wherein said objects of said object schema comprise components of said hierarchal breakdown of the components of the advanced technology article.

38. The computer implemented management domain of claim 37 wherein analyses are conducted with respect to select objects of said objects of said object schema.

39. The computer implemented management domain of claim 35 wherein said plurality of databases includes a component details database comprising component specifications for each component of the components of said article component database.

40. The computer implemented management domain of claim 39 wherein analyses are conducted with respect to select points of said hierarchal breakdown of the components of the advanced technology-article.

41. The computer implemented management domain of claim 40 wherein said objects of said object schema comprise components of said hierarchal breakdown of the components of the advanced technology article.

42. The computer implemented management domain of claim 41 wherein analyses are conducted with respect to select objects of said objects of said object schema.

43. The computer implemented management domain of claim 36 wherein said component details database comprises a status condition for each component of the components of said article component database.

44. The computer implemented management domain of claim 42 wherein analyses are conducted with respect to select points of said hierarchal breakdown of the components of the advanced technology article.

45. The computer implemented management domain of claim 44 wherein said objects of said object schema comprise components of said hierarchal breakdown of the components of the advanced technology article.

46. The computer implemented management domain of claim 45 wherein analyses are conducted with respect to select objects of said objects of said object schema.

47. The computer implemented management domain of claim 37 wherein said component details database further comprises documents supporting each component of the components of said article component database.

48. The computer implemented management domain of claim 34 wherein said at least a single select processor comprises a manufacturing readiness processor.

49. The computer implemented management domain of claim 48 wherein data of an article component database of said plurality of databases is processed by said manufacturing readiness processor.

50. The computer implemented management domain of claim 49 wherein said data of said article component database comprises a hierarchal breakdown of the components of the advanced technology article and information relating thereto.

51. The computer implemented management domain of claim 48 wherein said at least a single select processor further comprises a configuration check processor.

52. The computer implemented management domain of claim 51 wherein data of an article component database of said plurality of databases is processed by said configuration check processor.

53. The computer implemented management domain of claim 52 wherein said data of said article component database comprises a hierarchal breakdown of the components of the advanced technology article and information relating thereto.

54. The computer implemented management domain of claim 34 wherein said plurality of databases includes a project plan database comprising a hierarchal breakdown of activities associated with the production of the advanced technology article and/or components thereof.

55. The computer implemented management domain of claim 54 wherein analyses are conducted with respect to select points of said hierarchal breakdown of activities associated with the production of the advanced technology article and/or components thereof.

56. The computer implemented management domain of claim 55 wherein said objects of said object schema comprise components of said hierarchal breakdown of activities associated with the production of the advanced technology article and/or components thereof.

57. The computer implemented management domain of claim 56 wherein analyses are conducted with respect to select objects of said objects of said object schema.

58. The computer implemented management domain of claim 34 wherein said at least a single select processor further comprises a project management processor.

59. The computer implemented management domain of claim 58 wherein data of a project plan database of said plurality of databases are processed by said project management processor.

60. The computer implemented management domain of claim 59 wherein data of a project plan database of said plurality of databases comprises a network.

61. The computer implemented management domain of claim 59 wherein data of a project plan database of said plurality of databases comprise multiple information networks.

62. The computer implemented management domain of claim 61 wherein information networks of said multiple information networks include objects of an object schema.

63. The computer implemented management domain of claim 62 wherein said plurality of analyzers comprises a work flow analyzer.

64. The computer implemented management domain of claim 59 wherein said project plan database includes link points to other databases of said plurality of databases of said information library.

65. The computer implemented management domain of claim 64 wherein analyses are conducted with respect to said link points throughout an entirety of the management domain.

66. The computer implemented management domain of claim 65 wherein results of analyses conducted with respect to said link points throughout an entirety of the management domain are available to said project management processor for processing.

* * * * *